United States Patent
Park et al.

(10) Patent No.: US 10,356,829 B2
(45) Date of Patent: Jul. 16, 2019

(54) METHOD AND APPARATUS FOR TRANSMITTING METADATA IN WFD

(71) Applicant: LG ELECTRONICS INC., Seoul (KR)

(72) Inventors: Giwon Park, Seoul (KR); Dongcheol Kim, Seoul (KR); Byungjoo Lee, Seoul (KR); Youngjun Jo, Seoul (KR); Taesung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/754,475

(22) PCT Filed: Aug. 10, 2016

(86) PCT No.: PCT/KR2016/008794
§ 371 (c)(1),
(2) Date: Feb. 22, 2018

(87) PCT Pub. No.: WO2017/043775
PCT Pub. Date: Mar. 16, 2017

(65) Prior Publication Data
US 2018/0249512 A1    Aug. 30, 2018

Related U.S. Application Data

(60) Provisional application No. 62/215,754, filed on Sep. 9, 2015.

(51) Int. Cl.
*H04N 21/4363* (2011.01)
*H04W 76/10* (2018.01)
(Continued)

(52) U.S. Cl.
CPC .......... *H04W 76/10* (2018.02); *H04L 65/608* (2013.01); *H04L 65/80* (2013.01);
(Continued)

(58) Field of Classification Search
CPC ...... H04W 76/10; H04W 84/12; H04L 29/06; H04L 65/608; H04L 65/80; H04N 21/2368; H04N 21/435; H04N 21/43637
See application file for complete search history.

(56) References Cited

U.S. PATENT DOCUMENTS 8,677,029 B2    3/2014   Raveendran et al.
2013/0212222 A1*  8/2013  Outlaw .............. H04N 21/4305
                                                      709/219

(Continued)

*Primary Examiner* — Pankaj Kumar
*Assistant Examiner* — Alexander Boyd
(74) *Attorney, Agent, or Firm* — Dentons US LLP

(57) ABSTRACT

Provided are a method and an apparatus for transmitting metadata in a WFD. More particularly, a WFD source transmits, to a WFD sink, a first transmission stream in which an audio stream and a video stream are superimposed and multiplexed. The WFD source receives, from the WFD sink, a first RTSP request message for requesting transmission of metadata for audio data and video data during the transmission of the first transmission stream. The WFD source transmits, to the WFD sink, a first RTSP response message in response to the first RTSP request message during the transmission of the first transmission stream. The WFD source transmits, to the WFD sink, a metadata stream including the metadata and a second transmission stream in which the audio stream and the video stream are superimposed and multiplexed.

10 Claims, 15 Drawing Sheets

(51) Int. Cl.
  *H04L 29/06* (2006.01)
  *H04N 21/2368* (2011.01)
  *H04N 21/435* (2011.01)
  *H04W 84/12* (2009.01)

(52) U.S. Cl.
  CPC ....... *H04N 21/2368* (2013.01); *H04N 21/435* (2013.01); *H04N 21/43637* (2013.01); *H04W 84/12* (2013.01)

(56) References Cited

U.S. PATENT DOCUMENTS

| | | |
|---|---|---|
| 2013/0238702 A1 | 9/2013 | Sheth et al. |
| 2014/0096165 A1 | 4/2014 | Bei et al. |
| 2014/0120829 A1 | 5/2014 | Bhamidipati et al. |
| 2015/0095510 A1 | 4/2015 | Bhorkar et al. |
| 2016/0219346 A1* | 7/2016 | Kitazato ............. H04N 21/435 |
| 2018/0004383 A1* | 1/2018 | Iwami ............. H04N 21/43637 |

\* cited by examiner

FIG. 5
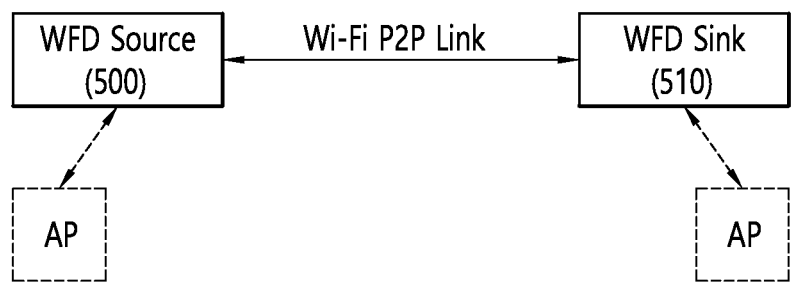
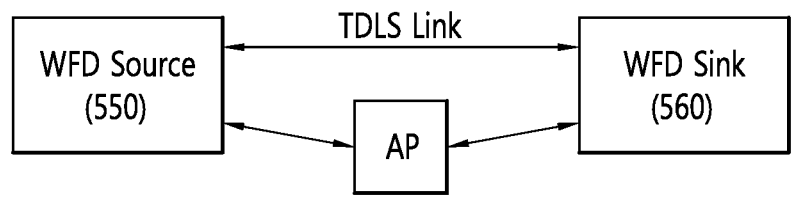

METHOD AND APPARATUS FOR TRANSMITTING METADATA IN WFD

CROSS-REFERENCE TO RELATED APPLICATIONS

This application is the National Stage filing under 35 U.S.C. 371 of International Application No. PCT/KR2016/008794, filed on Aug. 10, 2016, which claims the benefit of U.S. Provisional Application No. 62/215,754 filed on Sep. 9, 2015, the contents of which are all hereby incorporated by reference herein in their entirety.

BACKGROUND OF THE INVENTION

Field of the Invention

The present invention relates to wireless communication and more particularly, a method and device for transmitting metadata in WFD (WiFi (Wireless Fidelity) Display).

Related Art

Although the performance of mobile devices has evolved remarkably to be considered as the equivalent of personal computers (PCs), the mobile device still has its limitations in screen size. Most particularly, since portability is one of the most important features of the mobile device, it marginal line for screen size is said to be equal to 6 inches. However, for users who enjoy viewing multi-media content, a 6-inch display may still be considered to be a small screen.

Accordingly, extensive research is being carried out for developing a technology enabling users to watch images (or video) that were viewed in the mobile device through large-sized television (TV) screens or monitor screens. This technology may also be expressed by using the term wireless display transmission technology. The wireless display transmission technology may be broadly divided into content transmission and mirroring (screen casting). Instead of directly transmitting the display screen of the mobile device as it is, content transmission should be associated with Video on Demand (VOD) services. More specifically, content transmission is a method of sending images (or video) via signal, and mirroring is a method of sending a content filed to a remote device via streaming in order to show (or display) the same content once again through a large-sized screen, such as a TV screen.

Just as implied in the term itself, mirroring (screen casting) corresponds to a method of simultaneously showing a screen that is displayed on a mobile device as though it is reflected on a mirror. This is similar to a method of projecting a computer screen through a projector, when performing a presentation by establishing a wired connection, such as D-Subminiature (D-sub) (RGB), Digital Visual Interface (DVI), High-Definition Multimedia Interface (HDMI). The mirroring method is advantageous in that it can wirelessly transmit pixel information of an original screen without modification in real-time without being dependent on a specific service.

WiFi Miracast is being researched as a wireless display transmission technology using Wi-Fi. Miracast is a wireless image (or video) transmission standard as well as a wireless display transmission technology. Miracast is a type of mirroring (screen casting) technology, wherein the display screen and sound are compressed and outputted to a wireless LAN and then the compressed display screen and sound are decompressed in a dongle or an all-in-one receiver, thereby being displayed on the screen.

SUMMARY OF THE INVENTION

The present invention provides a method for transmitting metadata in WFD and a device using the method.

The present invention proposes a method for transmitting metadata in WFD.

First, to clarify terms, since WFD R2 may also be expressed as WFD2, this document uses the terms of WFD R2 and WFD2 interchangeably. Also, since embodiments according to the present invention are described based on the Miracast R2, WFD is used as a concept including the WFD R2. Accordingly, a WFD source is employed as a concept including a WFD R2 source while a WFD sink is employed as a concept including a WFD R2 sink.

First, the WFD source transmits the first transport stream in which the audio stream including the audio data and the video stream including the video data are superimposed and multiplexed to the WFD sink. The first transport stream is a stream obtained by superimposing and multiplexing only the audio stream and the video stream without the metadata stream.

The first transport stream may be transmitted after the capability negotiation procedure between the WFD source and the WFD sink. The capability negotiation procedure between the WFD source and the WFD sink is described below. The WFD source transmits a WFD service search request frame for searching for a service capability to the WFD sink. In addition, the WFD source receives a WFD service search response frame in response to the WFD service search request frame from the WFD sink. The WFD source establishes a WFD connection with the WFD sink based on the WFD service search response frame. After the WFD source establishes the WFD connection, the WFD source transmits a second RTSP request message to the WFD sink for the capability negotiation procedure with the WFD sink. The WFD source transmits a second RTSP response message to the WFD sink in response to the second RTSP request message. In this case, the second RTSP request/response message may correspond to the RTSP M1 request/response message or the RTSP M2 request/response message.

The WFD source receives a first real time streaming protocol (RTSP) request message for requesting the transmission of the metadata for the audio data and video data during the transmission of the first transport stream from the WFD sink.

The first RTSP request message includes a control format indicating information on the resolution of the video and information on the frames per second of the video is controlled by the metadata. In this case, the information on the resolution of the video and the frames per second of the video are streamed by the first transport stream. In this case, the first RTSP request message may correspond to the RTSP M21 request message.

The WFD source transmits, to the WFD sink, a first RTSP response message in response to the first RTSP request message during the transmission of the first transmission stream. In this case, the first RTSP response message may correspond to the RTSP M21 response message.

If the first RTSP response message agrees with the value set by the RTSP request message (OK), the WFD R2 source may thus transmit the second transport stream in which the audio stream and the video stream and the metadata stream including the metadata are superimposed and multiplexed to the WFD R2 sink.

In summary, when the information on the audio and/or video is changed, the WFD R2 sink requests that the changed information is controlled through the metadata. Therefore, the audio stream, the video stream, and the metadata stream are not superimposed and multiplexed to be transmitted as the first transport stream from the beginning, but since the control by the metadata is required, only when there is a request from the WFD R2 sink, the first transport stream may be changed to the second transport stream during the existing transmission of the first transport stream. As a result, it is not necessary to continuously transmit the metadata stream, so that a burden of streaming the metadata may be reduced.

The present invention proposes a device for transmitting metadata through WFD. The device may correspond to a WFD source, but the present invention is not limited to the aforementioned case.

First, to clarify terms, since WFD R2 may also be expressed as WFD2, this document uses the terms of WFD R2 and WFD2 interchangeably. Also, since embodiments according to the present invention are described based on the Miracast R2, WFD is used as a concept including the WFD R2. Accordingly, a WFD source is employed as a concept including a WFD R2 source while a WFD sink is employed as a concept including a WFD R2 sink.

The device includes a radio frequency (RF) unit transmitting and receiving a radio signal and a processor coupled operatively to the RF unit.

First, the processor transmits the first transport stream in which the audio stream including the audio data and the video stream including the video data are superimposed and multiplexed to the WFD sink. The first transport stream is a stream obtained by superimposing and multiplexing only the audio stream and the video stream without the metadata stream.

The first transport stream may be transmitted after the capability negotiation procedure between the WFD source and the WFD sink. The capability negotiation procedure between the WFD source and the WFD sink is described below. The WFD source transmits a WFD service search request frame for searching for a service capability to the WFD sink. In addition, the WFD source receives a WFD service search response frame in response to the WFD service search request frame from the WFD sink. The WFD source establishes a WFD connection with the WFD sink based on the WFD service search response frame. After the WFD source establishes the WFD connection, the WFD source transmits a second RTSP request message to the WFD sink for the capability negotiation procedure with the WFD sink. The WFD source transmits a second RTSP response message to the WFD sink in response to the second RTSP request message. In this case, the second RTSP request/response message may correspond to the RTSP M1 request/response message or the RTSP M2 request/response message.

The processor receives a first real time streaming protocol (RTSP) request message for requesting the transmission of the metadata for the audio data and video data during the transmission of the first transport stream from the WFD sink.

The first RTSP request message includes a control format indicating information on the resolution of the video and information on the frames per second of the video is controlled by the metadata. In this case, the information on the resolution of the video and the frames per second of the video are streamed by the first transport stream. In this case, the first RTSP request message may correspond to the RTSP M21 request message.

The processor transmits, to the WFD sink, a first RTSP response message in response to the first RTSP request message during the transmission of the first transmission stream. In this case, the first RTSP response message may correspond to the RTSP M21 response message.

If the first RTSP response message agrees with the value set by the RTSP request message (OK), the WFD R2 source may thus transmit the second transport stream in which the audio stream and the video stream and the metadata stream including the metadata are superimposed and multiplexed to the WFD R2 sink.

In summary, when the information on the audio and/or video is changed, the WFD R2 sink requests that the changed information is controlled through the metadata. Therefore, the audio stream, the video stream, and the metadata stream are not superimposed and multiplexed to be transmitted as the first transport stream from the beginning, but since the control by the metadata is required, only when there is a request from the WFD R2 sink, the first transport stream may be changed to the second transport stream during the existing transmission of the first transport stream. As a result, it is not necessary to continuously transmit the metadata stream, so that a burden of streaming the metadata may be reduced.

In a wireless communication system supporting the WFD R2, metadata is transmitted from a WFD source to a WFD sink, and therefore, useful information may be delivered to the user in an efficient manner. Also, various types of metadata may be configured, and therefore, various kinds of information about contents may be provided for the user. Further, since the metadata is transmitted only when the WFD sink requests the metadata for controlling the information on the audio and/or video, the burden of continuously streaming the metadata can be reduced.

BRIEF DESCRIPTION OF THE DRAWINGS

FIG. 5 is a conceptual view illustrating a network between a WFD source and a WFD sink.

DESCRIPTION OF EXEMPLARY EMBODIMENTS

In the conventional wireless LAN system, operations between devices (access point (AP) and station (STA)) within an infrastructure basic service set (BSS), wherein the access point (AP) functions as a hub, were mostly defined. The AP may perform a function of supporting a physical layer for a wireless/wired connection, a routing function for devices within the network, a function of adding/removing devices to/from the network, a function of providing services, and so on. More specifically, in the conventional wireless LAN system, devices within the network are connected through the AP and not connected to one another by direct connection.

As a technology for supporting direct connection between devices, a Wi-Fi Direct standard is being defined. Wi-Fi Direct is a direct communication technology allowing devices (or stations (STAs)) to be easily connected to one another without an access point, which is essentially required in the conventional wireless LAN system. In case Wi-Fi Direct is being used, connection between the devices is configured without any complicated configuration (or set-up) procedures. Thus, diverse services may be provided to the user.

In the Wi-Fi Alliance (WFA), a Wi-Fi Direct service (WFDS), which supports diverse services using a Wi-Fi Direct link (e.g., Send, Play, Display, Print, and so on), is being researched. According to the WFDS, an application may be controlled or managed by a service platform, which is referred to as an Application Service Platform (ASP).

A WFDS device supporting a WFDS includes devices supporting a wireless LAN system, such as display devices, printers, digital cameras, projectors, smart phones, and so on. Also, the WFDS device may include an STA and an AP. WFDS devices within a WFDS network may be directly connected to one another.

Figure 1:
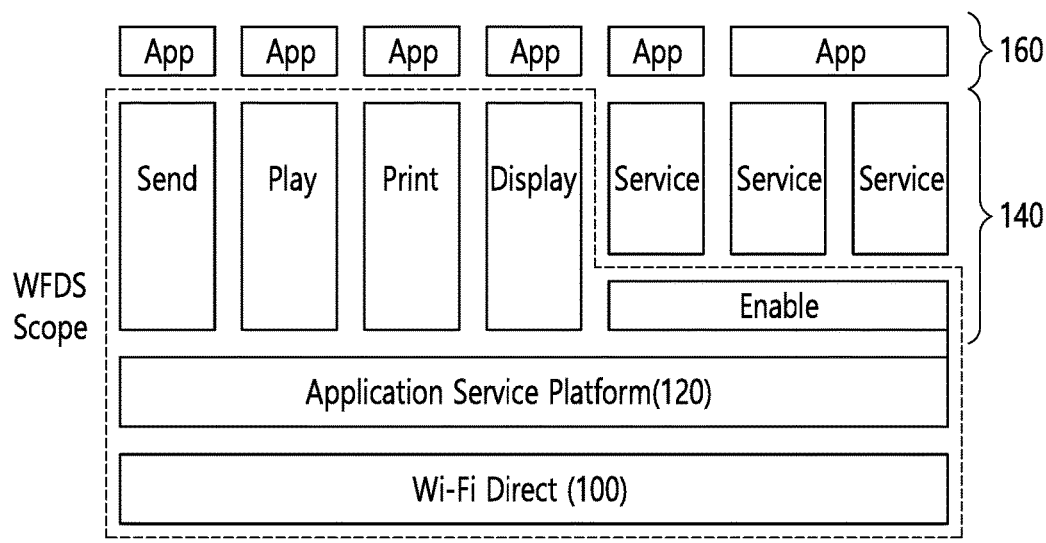
FIG. 1 is a conceptual view illustrating Wi-Fi Direct Service (WFDS) configuration elements (or components).

FIG. 1 is a conceptual view illustrating Wi-Fi Direct Service (WFDS) configuration elements (or components).

Referring to FIG. 1, a WFDS framework may include a Wi-Fi Direct layer 100, an ASP 120, a service layer 140, and an application layer 160.

The Wi-Fi Direct layer 100 corresponds to a medium access control (MAC) layer, which is defined in the Wi-Fi Direct standard. A wireless connection may be configured by a physical layer (not shown), which is backward compatible with a Wi-Fi PHY, below the Wi-Fi Direct layer 100. An Application Service Platform (ASP) 120 is defined above the Wi-Fi Direct layer 100.

The ASP 120 corresponds to a common shared platform, and the ASP 120 performs the functions of session management, service command processing, and control and security between ASPs between the Application layer 160, which is a higher layer of the ASP 120, and the Wi-Fi Direct layer 100, which is a lower layer of the ASP 120.

The Service layer 140 is defined above the ASP 120. For example, the Service layer 140 may support 4 basic service, which correspond to Send, Play, Display, and Print services, and a service that is defined in a third-party application. Moreover, the Service layer 140 may also support Wi-Fi Serial Bus (WSB), Wi-Fi Docking, or Neighbor Awareness Networking (NAN).

The application layer 160 may provide a user interface (UI), and the application layer 160 may also express information in a format that can be recognized by human beings and may deliver (or transport) user input to a lower layer.

Hereinafter, the exemplary embodiment of the present invention will disclose a wireless fidelity (Wi-Fi) display (WFD) among the WFDS in more detail.

The WFD standard was defined for performing transmission of audio/video (AV) data between devices while satisfying high quality and low latency. Wi-Fi devices may be connected to one another by using a peer-to-peer method through a WFD network (WFD session) to which the WFD standard is applied without passing through a home network, an office network, or a hotspot network. Hereinafter, a device that transmits and receives data in accordance with the WFD standard may be expressed by using the term WFD device. The WFD devices within the WRD network may discover information on the WFD devices (e.g., capability information) corresponding to one another. And, then, after configuring (or setting up) the WFD session, the WFD devices may perform rendering on the contents through the WFD session.

A WFD session may correspond to a network between a source device, which provides contents, and a sink device, which receives and performs rendering of the contents. The source device may also be expressed by using the term WFD source, and the sink device may also be expressed by using the term WFD sink. The WFD source may perform mirroring of the data existing in the display (or screen) of the WFD source to the display of the WFD sink.

The WFD source and the WFD sink may exchange a first sequence message between one another and may then perform device discovery and service discovery procedures. After completing the device discovery and service discovery procedures between the WFD source and the WFD sink, an internet protocol (IP) address may be allocated to each of the WFD source and the WFD sink. A transmission control protocol (TCP) connection may be established between the WFD source and the WFD sink, and, afterwards, real-time streaming protocol (RTSP) and real-time protocol (RTP) stacks corresponding to the WFD source and the WFD sink may be activated.

A capability negotiation procedure between the WFD source and the WFD sink may be performed through the RTSP, and, while the capability negotiation procedure is being carried out, the WFD source and the WFD sink may exchange RTSP-based messages (message (M) 1 to M4). Thereafter, the WFD source and the WFD sink may exchange WFD session control messages. Also, a data session may be established between the WFD source and the WFD sink through the RTP. In the WFD network, a User Datagram Protocol (UDP) may be used for data transport.

Figure 2:
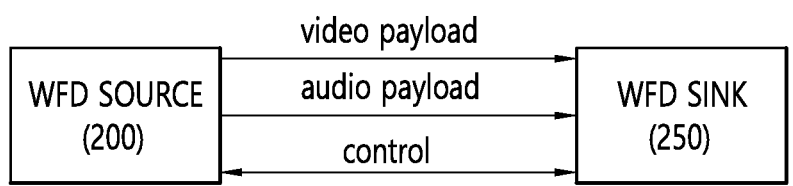
FIG. 2 is a conceptual view illustrating a WFD network.

FIG. 2 is a conceptual view illustrating a WFD network.

Referring to FIG. 2, as WFD devices, a WFD source 200 and a WFD sink 250 may be connected to one another based on WiFi-P2P.

Herein, the WFD source 200 may refer to a device supporting streaming of multimedia contents through a WiFi peer to peer (P2P) link, and the WFD sink 250 may refer to a device performing procedures of receiving multimedia contents from the WFD source 200 through the P2P link and generating image and/or sound. The procedure of generating image and/or sound may also be expressed by using the term rendering.

The WFD sink 250 may be divided into a primary sink and a secondary sink. Most particularly, when independently connected to the WFD source 200, the secondary sink may perform rendering only on an audio payload.

Figure 3:
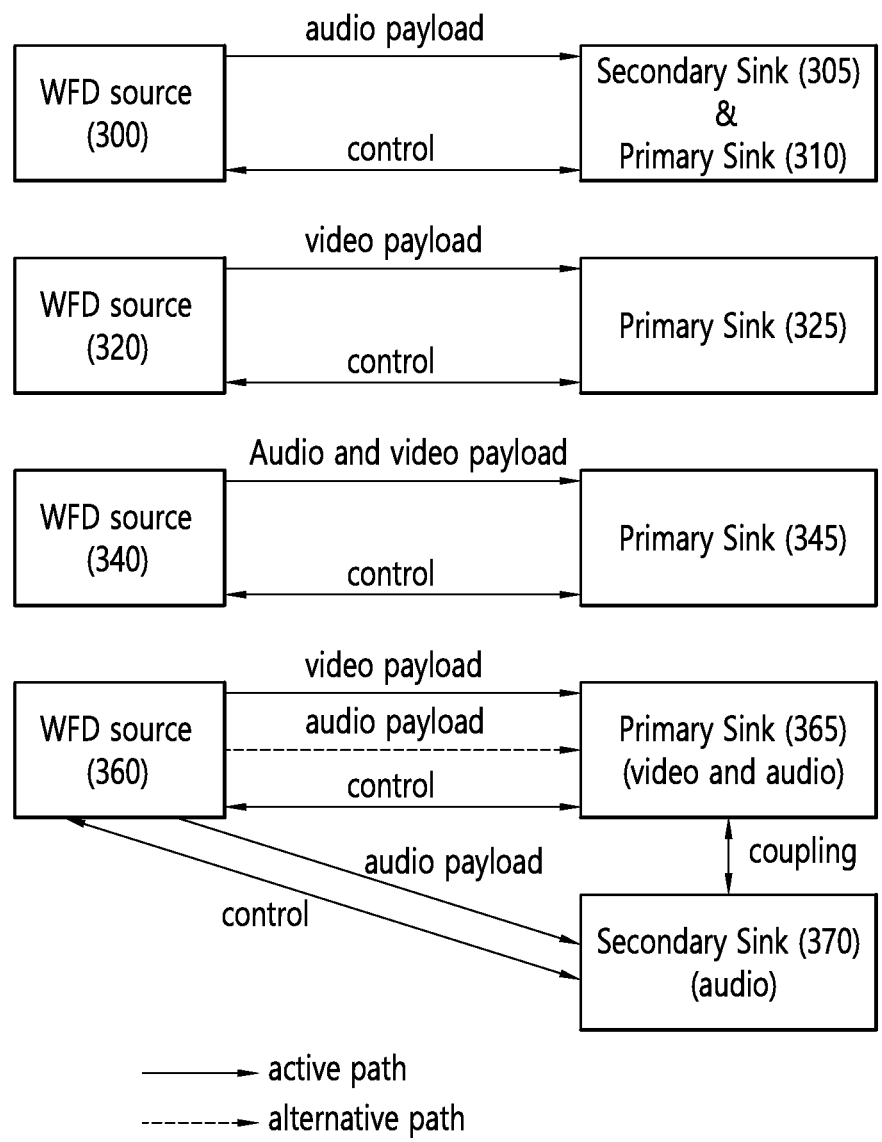
FIG. 3 is a conceptual view illustrating a WFD session.

FIG. 3 is a conceptual view illustrating a WFD session.

The first part starting from the top of FIG. 3 corresponds to an audio-only session. A WFD source 300 may be connected to any one of a primary sink 305 and a secondary sink 310 through the audio-only session.

The second part starting from the top of FIG. 3 corresponds to a video-only session. A WFD source 320 may be connected to a primary sink 325.

The third part starting from the top of FIG. 3 corresponds to an audio and video session, and, just as in the video-only session, a WFD source 340 may be connected to a primary sink 345.

The fourth part starting from the top of FIG. 3 discloses a session connection in a Coupled WFD Sink operation. In the Coupled Sink WFD operation, the primary sink 365 may perform video rendering, and the secondary sink 370 may perform audio rendering. Alternatively, the primary sink 365 may perform both video rendering and audio rendering.

The above-described WFD sessions may be established after performing the procedures described below in FIG. 4.

Figure 4:
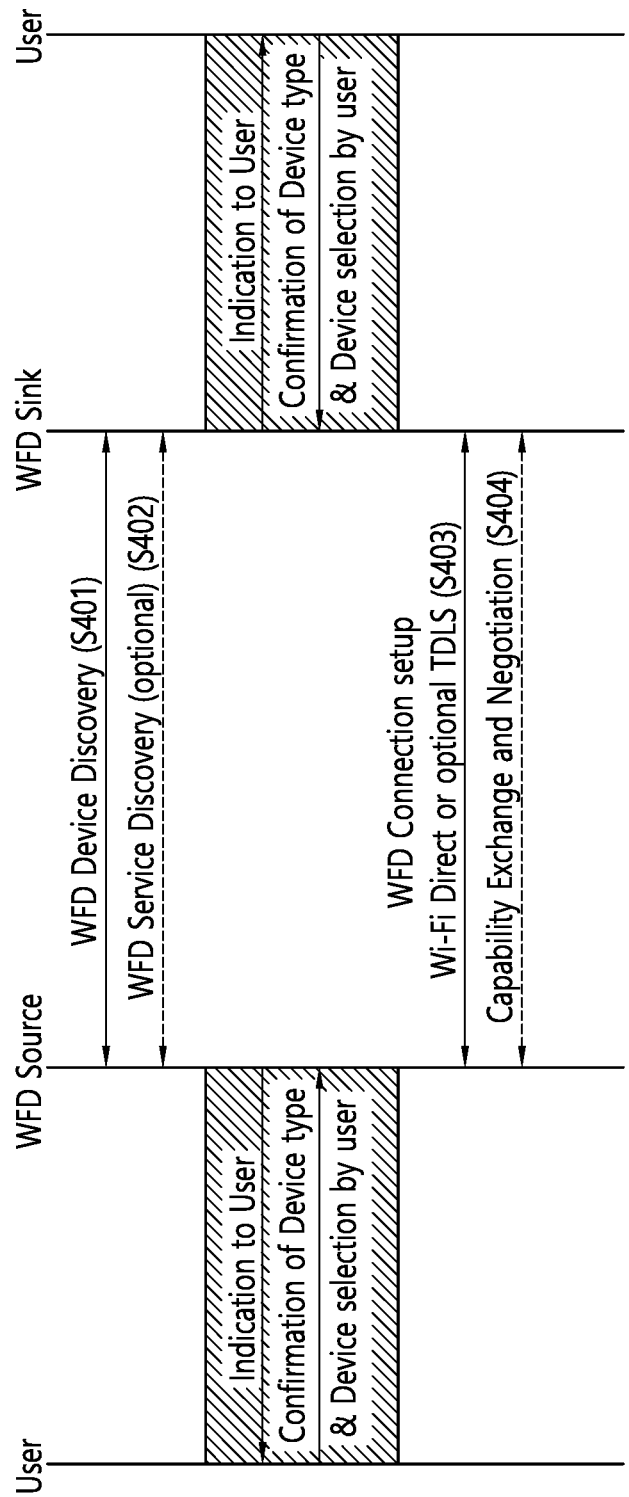
FIG. 4 is a conceptual view illustrating a WFD session configuration method.

FIG. 4 is a conceptual view illustrating a WFD session configuration method.

Referring to FIG. 4, the WFD session may be set up (or configured) after performing WFD Device Discovery S401, WFD Service Discovery S402, WFD Connection Setup S403, and Capability Exchange and Negotiation S404 procedures.

More specifically, in the procedure of WFD Device Discovery S401, the WFD source may discover a peer device for WFD, i.e., WFD sink by performing the WFD Device Discovery procedure.

A beacon frame, a probe request frame, and a probe response frame, which are transmitted by the WFD source and the WFD sink for the WFD Device Discovery, may include WFD Information Element (IE). Herein, WFD IE may correspond to an information element including information related to the WFD, such as device type, device status, and so on.

The WFD source may transmit a probe request frame including a WFD IE to the WFD sink, and the WFD sink may transmit a probe response frame including a WFD IE as a response to the probe request frame. In case the WFD device is associated with an infrastructure AP and operates as a Wi-Fi P2P device, a WFD IE and a P2P information element may be included in the probe request frame. The probe response frame, which is transmitted as a response to the probe request frame, may be transmitted through the channel through which the probe request frame was received and may include both the P2P IE and the WFD IE.

Details related to the WFD Device Discovery procedure that are not mentioned in this description may follow related documents, such as 'Wi-Fi Display Technical Specification' and/or 'Wi-Fi Peer-to-Peer (P2P) Technical Specification' Wi-Fi Direct Service Addendum', and this may also be applied to the descriptions that follow.

In the procedure of WFD Service Discovery S402, a discovery procedure corresponding to service capability between the WFD source and the WFD sink, which have performed WFD Device Discovery, may be performed. For example, if the WFD source transmits a service discovery request frame, which includes information on WFD capability, the WFD sink may transmit a service discovery response frame, which includes information on the WFD capability, as a response to the service discovery request frame. The WFD service discovery procedure may correspond to an optional procedure.

In order to perform the WFD service discovery procedure, the probe request frame and the probe response frame, which are used in the WFD device discovery procedure, may include information indicating whether or not the WFD device is equipped with the capability supporting the service discovery procedure.

In the procedure of WFD Connection Setup S403, the WFD device, which has performed the WFD device discovery procedure, and which has optionally performed the WFD service discovery procedure, may select a WFD device for performing WFD connection setup. After the WFD device is selected for the WFD connection setup in accordance with the policy or user input, and so on, any one of the connectivity schemes between Wi-Fi P2P and tunneled direct link service (TDLS) may be used for WFD connection. The WFD devices may determine a connection method based on an associated basic service set identifier (BSSID) subelement, which is transported along with preferred connectivity information and WFD information elements.

FIG. 5 is a conceptual view illustrating a network between a WFD source and a WFD sink.

An upper part of FIG. 5 discloses a connection between a WFD source 500 and a WFD sink 510 that is based on Wi-Fi P2P, and a lower part of FIG. 5 discloses a connection between a WFD source 550 and a WFD sink 560 that is based on a TDLS link.

As shown in the upper part of FIG. 5, the AP may be common to both the WFD source 500 and the WFD sink 510, or the AP may be different for each of the WFD source 500 and the WFD sink 510. Alternatively, the AP may not exist. As shown in the lower part of FIG. 5, in case WFD connection is performed by using a TDLS link, the WFD source 550 and the WFD sink 560 shall maintain connection with the same AP.

The WFD capability exchange and negotiation procedure may be performed after performing the WFD connection setup procedure between the WFD devices. By performing the WFD capability exchange and negotiation procedure, the WFD source and the WFD sink may exchange at least one set of information on the codec supported by each of the WFD source and the WFD sink, profile information of the codec, level information of the codec, and resolution information. The WFD capability exchange and negotiation procedure may be performed by exchanging messages using a Real Time Streaming Protocol (RTSP). Also, a parameter set defining audio/video payload during a WFD session may be determined. The WFD capability exchange and negotiation procedure may be performed by exchanging messages starting from RTSP M1 to RTSP M4, as shown in FIG. 6.

The WFD session establishment procedure may be performed after the WFD exchange and negotiation procedure.

Figure 6:
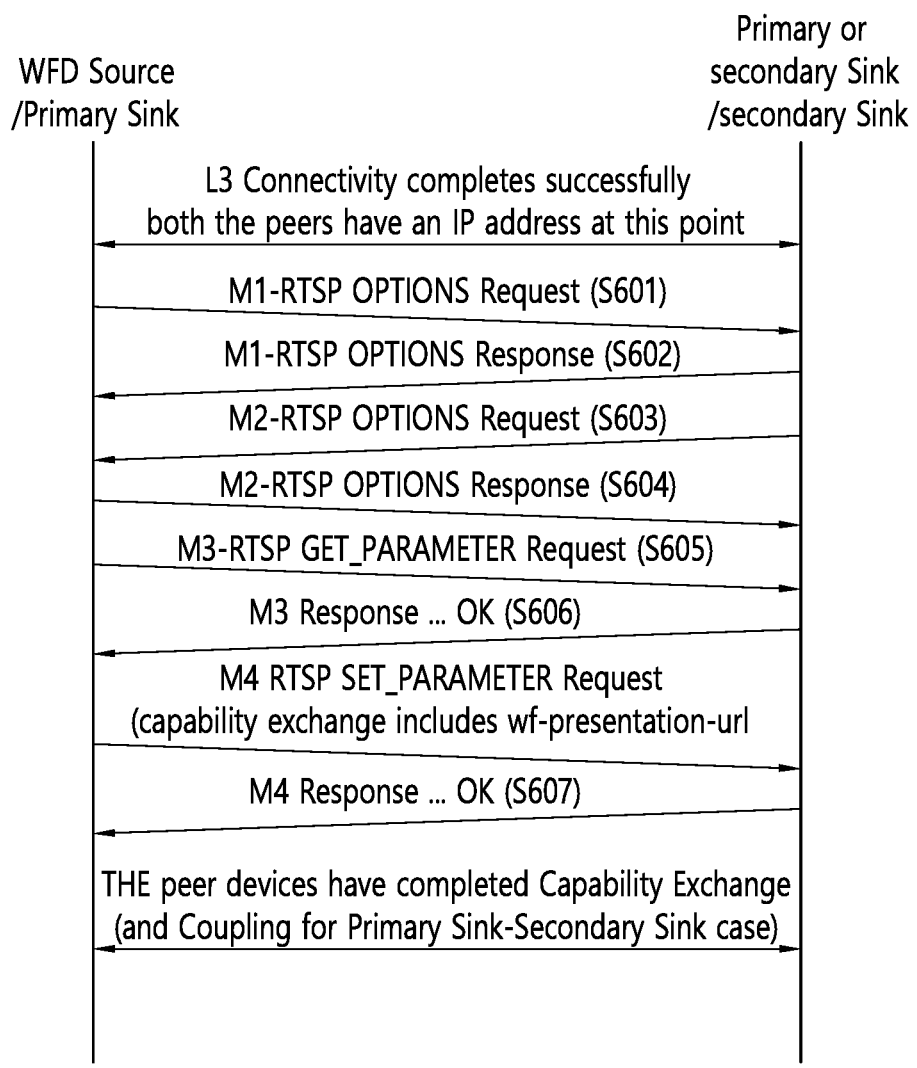
FIG. 6 is a conceptual view illustrating WFD capability exchange and negotiation procedures.

FIG. 6 is a conceptual view illustrating WFD capability exchange and negotiation procedures.

Referring to FIG. 6, the WFD source may transmit a RTSP M1 request message for initiating a RSTP procedure and WFD capability negotiation (step S601).

The RTSP M1 request message may include a RTSP OPTIONS request for determining a RTSP method set, which is supported by the WFD sink. The WFD sink that has received the RTSP M1 request message may transmit a RTSP M1 response message including a list of RTSP methods, which are supported by the WFD sink (step S602).

Subsequently, the WFD sink may transmit a RTSP M2 request message for determining a RTSP method set, which is supported by the WFD source (step S603).

When the RTSP M2 request message is received, the WFD source may respond to the request message by transmitting a RTSP M2 response message including a list of RTSP methods, which are supported by the WFD source (step S604).

The WFD source may transmit a RTSP M3 request message (RTSP GET_PARAMETER request message) specifying a list of WFD capabilities that the WFD source wishes to know (step S605).

When the RTSP M3 request message is received, the WFD sink may respond to the request message by transmitting a RTSP M3 response message (RTSP GET_PARAMETER response message) (step S606).

Based on the RTSP M3 response message, the WFD source may determine an optimal parameter set that is to be used during a WFD session, and, then, the WFD source may transmit a RTSP M4 request message (RTSP SET_PARAMETER request message), which includes the determined parameter set, to the WFD sink.

The WFD sink that has received the RTSP M4 request message may transmit a RTSP M4 response message (RTSP SET_PARAMETER response message) (step S607).

Figure 7:
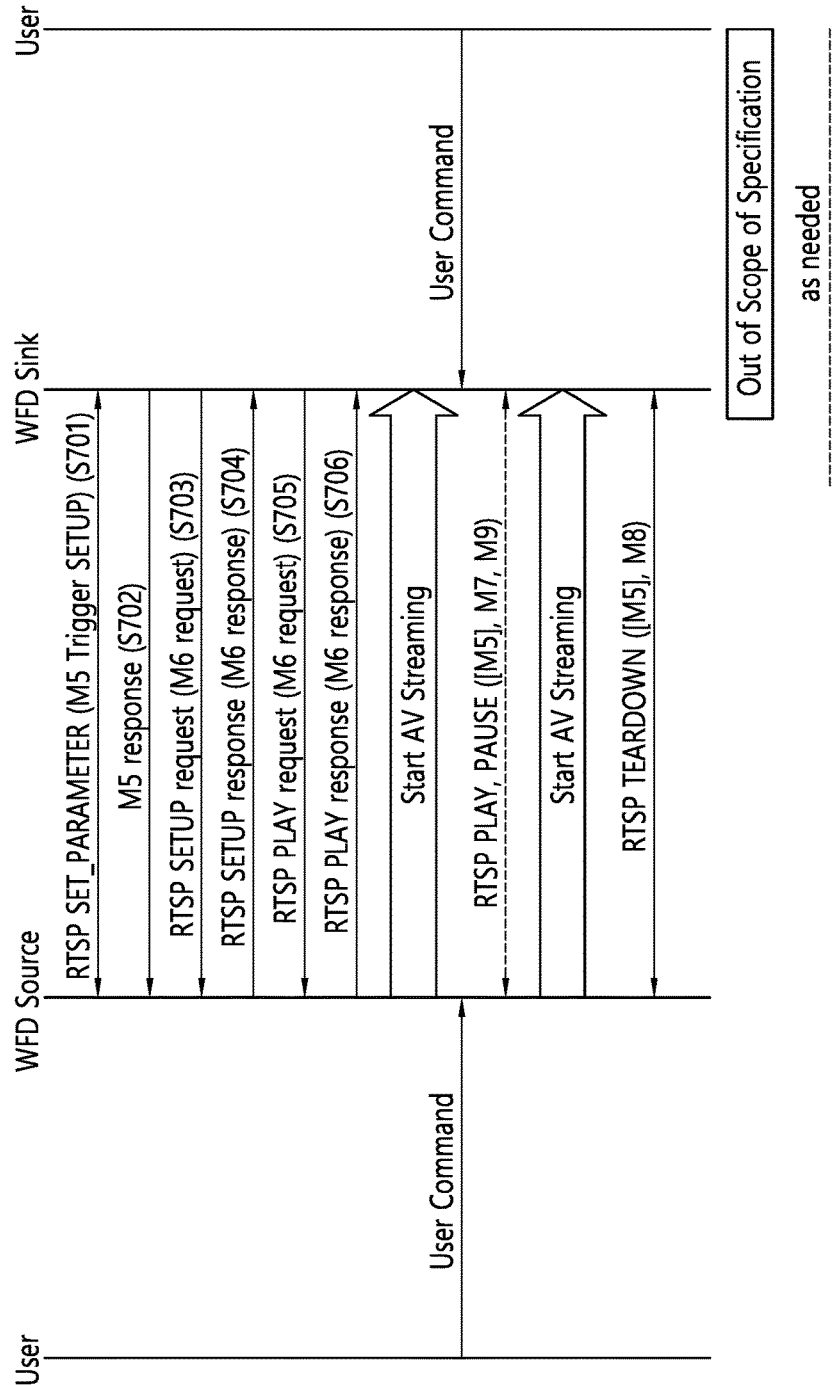
FIG. 7 is a conceptual view illustrating a WFD session establishment procedure.

FIG. 7 is a conceptual view illustrating a WFD session establishment procedure.

In FIG. 7, the WFD sources/WFD sinks that have performed WFD capability exchange and negotiation may establish a WFD session. More specifically, the WFD source may transmit a RTSP SET parameter request message (RTSP M5 Trigger SETUP request) to the WFD sink S701.

The WFD sink may transmit a RTSP M5 response message as a response to the RTSP SET parameter request message (step S702).

If the RTSP M5 message including the trigger parameter SETUP is successfully exchanged, the WFD sink may transmit a RTSP SETUP request message (RTSP M6 request) to the WFD source (step S703).

If the RTSP M6 request message is received, the WFD source may respond to the request message by transmitting a RTSP SETUP response message (RTSP M6 response) (step S704).

A successful establishment of a RTSP session may be indicated by setting up a status code of the RTSP M6 response message.

After a successful exchange of the RTSP M6 message, the WFD sink may transmit a RTSP M7 request message to the source device in order to notify that the WFD sink is ready to receive RTP streams (step S705), and the WFD source may respond to the request message by transmitting a RTSP PLAY response message (RTSP M7 response message) (step S706). A successful establishment of a WFD session may be indicated based on the status code of a RTSP PLAY response message.

After a WFD session is established, the WFD source may transmit a RTSP M3 request message (RTSP GET_PARAMETER request message) for acquiring capability corresponding to at least one RTSP parameter that is supported by the WFD sink, a RTSP M4 request message for setting up at least one RTSP parameter value in order to perform capability re-negotiation between the WFD source and WFD sink for updating an Audio/Video (AV) format, a RTSP M5 request message triggering the WFD sink to transmit a RTSP PAUSE request message (RTSP M9 request message), a RTSP M12 request message indicating that the WFD source has entered a WFD standby mode, a RTSP M14 request message for selecting input type, input device, and other parameters that are to be used in a user input back channel (UIBC), or a RTSP M15 request message for enabling or disabling a user input back channel (UIBC), and so on, to the WFD sink. The WFD sink that has received the above-described RTSP request messages from the WFD source may respond to the received request messages by transmitting RTSP response messages.

Subsequently, the WFD sink may transmit a RTSP M7 request message (RTSP PLAY request message for initiating (or resuming) audio/video streaming, a RTSP M9 request message (RTSP PAUSE request message) for temporarily interrupting audio/video streaming that is being transmitted from the WFD source to the WFD sink, a RTSP M10 request message for requesting the WFD source to change the audio rending device, a RTSP M11 request message indicating a change in an active connector type, a RTSP M12 request message indicating that the WFD sink has entered the WFD standby mode, a M13 request message requesting the WFD source to refresh an instantaneous decoding refresh (IDR), a RTSP M14 request message for selecting input type, input device, and other parameters that are to be used in a UIBC, or a RTSP M15 request message for enabling or disabling a UIBC, and so on, to the WFD source. The WFD source that has received the RTSP request messages, which are listed above, may respond to the received request messages by transmitting RTSP response messages.

Once the WFD session is established and audio/video streaming is initiated, the WFD source and the WFD sink may carry out audio/video streaming by using a codec that is commonly supported by both the WFD source and the WFD sink. By using the codec that is commonly supported by both the WFD source and the WFD sink, interoperability between the WFD source and the WFD sink may be ensured.

WFD communication is based on a WFD IE, and a format of the WFD IE may be defined as shown below in Table 1.

TABLE 1

| Field | Size (octets) | Value (Hexadecimal) | Description |
| --- | --- | --- | --- |
| Element ID | 1 | DD | IEEE 802.11 vendor specific usage |
| Length | 1 | Variable | Length of the following fields in the IE in octets. The length field is variable and set to 4 plus the total length of WFD subelements. |

TABLE 1-continued

| Field | Size (octets) | Value (Hexadecimal) | Description |
|---|---|---|---|
| OUI | 3 | 50-6F-9A | WFA Specific OUI |
| OUI Type | 1 | 0A | Identifying the type or version of the WFD IE. Setting to 0x0A indicates WFA WFD v1.0 |
| WFD subelements | Variable | | One or more WFD subelements appear in the WFD IE |

The format is configured of an element ID field, a Length field, a WFD-specific OUI field, a OUI type field indicating a type/version of the WFD IE, and a WFD subelement field. The WFD subelement field is configured to have a format that is shown below in Table 2.

TABLE 2

| Field | Size (octets) | Value (Hexadecimal) | Description |
|---|---|---|---|
| Subelement ID | 1 | | Identifying the type of WFD subelement. The specific value is defined in Table 5-3. |
| Length | 2 | Variable | Length of the following fields in the subelement |
| Subelements body field | Variable | | Subelement specific information fields |

The subelement ID field may be defined as shown below in Table 3.

TABLE 3

| Subelement ID (Decimal) | Notes |
|---|---|
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11-255 | Reserved |

Referring to Table 3, the 1-octet subelement ID field may indicate which type of information is included in the WFD subelement. More specifically, the values 0, 1, . . . , 10 of the subelement ID field may respectively indicate that each of the subelements corresponds to a WFD Device Information subelement, an Associated BSSID subelement, a WFD Audio Formats subelement, a WFD Video Formats subelement, a WFD 3D Video Formats subelement, a WFD Content Protection subelement, a Coupled Sink Information subelement, a WFD Extended Capability subelement, a Local IP Address subelement, a WFD Session Information subelement, and an Alternative MAC Address subelement. Herein, the WFD Device Information subelement may include information that is required for determining whether or not to attempt pairing with a WFD device and session generation. The Associated BSSID subelement may be used for indicating the address of the currently associated AP.

Each of the WFD Audio Formats subelement, the WFD Video Formats subelement, and the WFD 3D Video Formats subelement may be used to respectively indicate capabilities of the WFD device related to audio, video, and 3D video. The WFD Content Protection subelement transports information related to a content protection method, and the Coupled Sink Information subelement may deliver information related to the status of the coupled sink, the MAC address, and so on. The WFD Extended Capability subelement may be used for transporting diverse capability information of other WFD devices, and the Local IP Address subelement may be used for transporting an IP address to a WFD peer during a TDLS setup procedure. The WFD Session Information subelement may include information corresponding to a list information technicians of WFD device information within a WFD group. In case the WFD connection method requires an interface (e.g., MAC address) that is different from the interface used in the device discovery procedure, the Alternative MAC Address subelement may transport the related information.

Hereinafter, the exemplary embodiment of the present invention will disclose a method for transmitting information corresponding to user input (UI) and subtitles via WFD (or miracast).

Most particularly, each of a UI image/subtitle may be packetized, so as to be generated as a separate Packetized Elementary Stream (PES). Thereafter, the generated PES may be overlaid and multiplexed (MUXed) to a video stream through a multiplexer of an MPEG2-transport stream (TS) and may then be transmitted. The exemplary embodiment of the present invention will disclose a method for configuring (or setting up) UI image/subtitles transmitted by the WFD source and optimized by the WFD sink.

According to the exemplary embodiment of the present invention, the WFD source may recognize a native resolution of the WFD sink and may then transmit a UI stream and a subtitle stream having a resolution that is optimized to the WFD sink. Based on this method, the WFD sink may output a UI image/subtitle image having an optimal size within the display of the WFD sink on the display of the WFD sink without any degradation in picture quality.

Additionally, in case the UI image and the subtitle image overlays within the video image, the exemplary embodiment of the present invention will hereinafter disclose a method performed by the WFD sink of including information related to overlay in the UIBC data (or UIBC body format) and transmitting the processed UIBC data. The information related to the overlay may include an overlay index, a stream index, and so on. Based on the information related to the overlay, which is included in the UIBC data being transmitted through the UIBC, the WFD source may accurately recognize the intentions of the user's motions (or operations) performed on the WFD sink.

The stream, which is transmitted from the WFD source and multiplexed to a single MPEG2-TS, may include a plurality of audio streams/video streams, UI streams, and subtitle streams, and the WFD sink may perform demultiplexing on the stream, which is multiplexed as a single MPEG2-TS, and, then, the WFD sink may overlay the plurality of different streams by using a method that is referred to as alpha-blending. Thereafter, the WFD sink may output the overlaid streams to the display of the WFD sink.

The MPEG2-TS is merely an example of a transport stream for performing overlay multiplexing on a plurality of streams, and a transport stream of another format (or structure) may be used instead of the PEG2-TS for multiplexing and transmitting audio streams/video streams, UI streams, subtitle streams, and so on.

Figure 8:
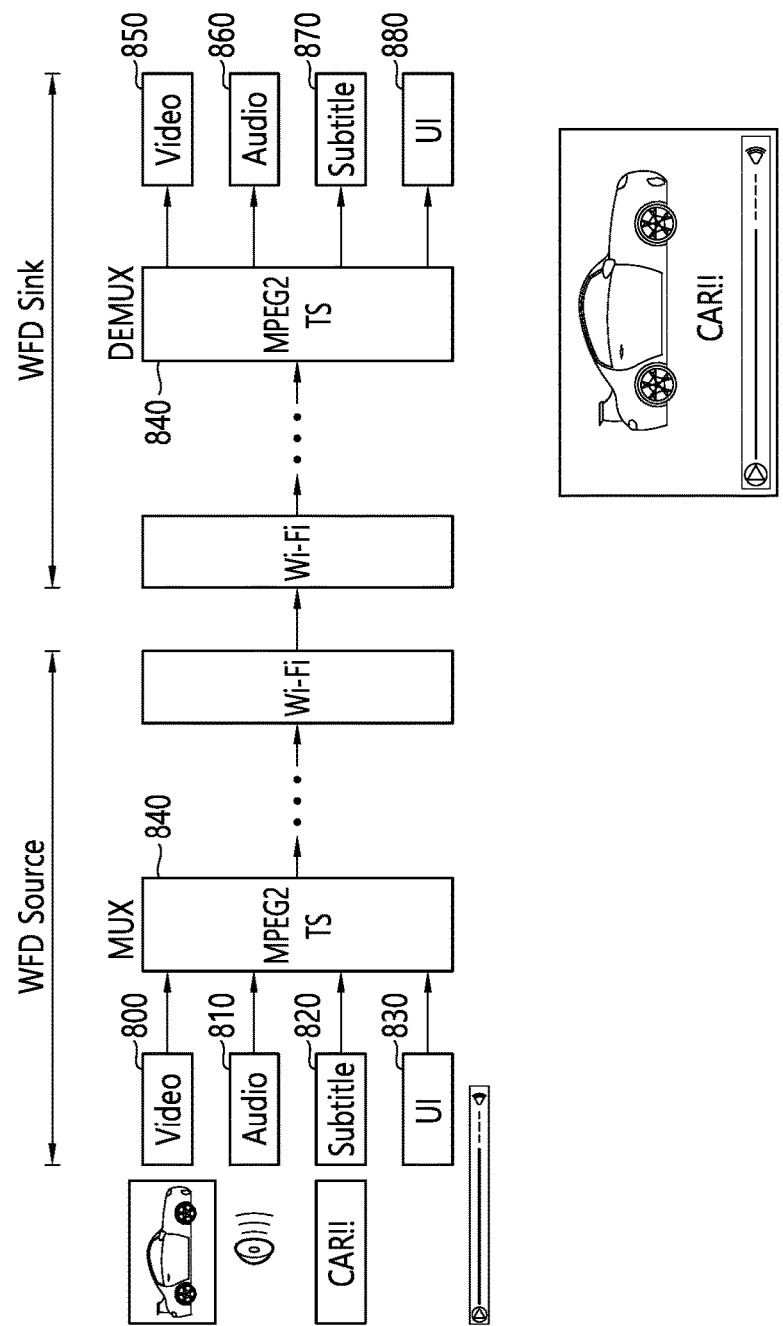
FIG. 8 is a conceptual view illustrating a method for transmitting and receiving a plurality of streams based on MPEG-TS according to an exemplary embodiment of the present invention.

FIG. 8 is a conceptual view illustrating a method for transmitting and receiving a plurality of streams based on MPEG-TS according to an exemplary embodiment of the present invention.

Referring to FIG. 8, a video stream 800, an audio stream 810, a subtitle stream 820, and a user interface stream 830 may be processed with overlay multiplexing, thereby being generated as a MPEG2-TS 840.

The video stream 800 may include video data, the audio stream 810 may include audio data, the subtitle stream 820 may include subtitle data, and the user interface stream 830 may include data corresponding to the user interface.

The video stream 800, the audio stream 810, the subtitle stream 820, and the user interface stream 830 may correspond to individual elementary streams (ESs), and each of the ESs may have a different format, a different resolution, and a different bit rate. Each of the ESs may be packetized so as to be generated as a plurality of PESs, and each of the plurality of PESs may be processed with overlay multiplexing, thereby being generated as an MPEG2-TS.

The WFD source may transmit the MPEG2-TS 840 to the WFD sink based on WiFi Direct (WiFi peer to peer (P2P)).

The WFD sink may receive the MPEG2-TS 840 based on WiFi Direct. The MPEG2-TS 840 may be demultiplexed in the WFD sink and may then be split (or separated) to a video stream 850, an audio stream 860, a subtitle stream 870, and a user interface stream 880. The separated video stream 850, audio stream 860, subtitle stream 870, and user interface stream 880 play be played (or reproduced) based on alpha-blending (or overlaying).

In what follows, Miracast R2 (Release 2) will be described.

The Miracast R2 may improve Miracast user experience by introducing a method for triggering an adequate user behavior for proper operation of a Miracast service. In this respect, the present invention may provide useful information for a Miracast R2 user to improve user experience in the Miracast R2. The useful information for the Miracast R2 user may be utilized as a good example of the WFD R2 (Release 2). Since the WFD R2 may also be expressed as WFD2, the present document uses the terms of WFD R2 and WFD2 interchangeably. Also, since embodiments of the present invention are described with respect to the Miracast R2, WFD is used in such a way to include the WFD R2. Accordingly, a WFD source is used as a concept including a WFD R2 source, and a WFD sink is used as a concept including a WFD R2 sink. Here, a WFD sink may be divided into a primary sink and a secondary sink. As a function and service specified in the WFD, metadata operation is not supported in the Miracast R1 but is supported in the Miracast R2. In other words, all of a WFD source, WFD primary sink, and WFD secondary sink support the metadata operation only in the R2 specification.

A scenario for using useful information with respect to the Miracast R2 user is as follows. The user may display a live concert from a WFD R2 source to a WFD R2 sink. The WFD R2 sink includes information about remaining battery power of the WFD R2 source. During a WFD R2 session, the WFD R2 source may deliver battery information to the WFD R2 sink. If the user pushes a certain button on a remote controller, the battery information of the WFD R2 source (for example, information about the remaining battery power) may be displayed. The user may take an action on the basis of the battery information displayed (for example, charging the battery of the WFD R2 source, stopping playing an A/V stream, changing a refresh rate, or doing no particular action).

Also, another scenario for using useful information with respect to the Miracast R2 user is as follows. The user may display a live concert from a WFD R2 source to a WFD R2 sink. The WFD R2 sink may have AV contents information played in the WFD R2 source. During a WFD R2 session, the WFD R2 source may deliver AV contents information to the WFD R2 sink. The user may want to know additional information about the AV contents played on the WFD R2 sink. If the user pushes a certain button on a remote controller, contents related to the additional information of the WFD R2 source (for example, title, type, duration, resolution, size, and protect information) may be displayed on the screen of the WFD R2 sink.

Useful information with respect to the Miracast R2 user includes battery related information, streaming contents information, wireless quality related information, and background service information.

Battery related information gives information about remaining battery power (for example, 15% or 50%) or information about the type of power supply (for example, battery mode or action mode). An expected user action with respect to the information may include charging battery of the WFD R2 source, stopping playing of an A/V stream, changing a refresh rate, or doing no particular action. A format of the battery related information with respect to the Miracast R2 user may be defined as shown in Table 4 below.

TABLE 4 wfd2-battery = "wfd2_battery:" SP remaining-battery SP power-supply-type CRLF
remaining-battery = 2*2HEXDIG: remaining battery capacity in units of %.
Power-supply-type = "BatteryMode" / "Charging" /"ACMode": If the Power-supply-type field is "Charging", the remaining-battery field is set to the current percentage of WFD R2 Source. If the Power-supply-type is "ACMode", the remaining-battery field is set to 100%.

Streaming contents information includes title, type (video or mp4), duration, resolution, size, and protect information (about whether premium contents are being streamed). URL (Uniform Resource Locator) information (target URL) may be provided from external contents (for example, you-tube and MLB TV live) of the WFD R2 source. An expected user action with respect to the information may include simply providing useful contents or taking various actions according to the URL information of AV contents. The user may obtain other AV contents by connecting to a website (which displays an URL of the WFD R2 sink). A format of the streaming contents information with respect to the Miracast R2 user may be defined as shown in Table 5 below.

TABLE 5

```
wfd2-streaming-contents-info = "wfd2_streaming_contents_info:" SP
title SP time SP type SP duration SP resolution SP size SP protect CRLF
title       = 255*255HEXDIG; Specifying the title of the streaming
contents.
type        = 2*2HENDIG; specifying video codec.
duration    = 8*8HEXDIG; specifying total duration of media in seconds
resolution  = 8*8HENDIG; detailing resolution supported by the video
codec
size        = 8*8HENDIG; specifying total size of the media file in
bytes
protect     = "Premium" / "NonPremium"
```

Wireless quality related information may include channel quality, latency information, connection type (Wi-Fi Direct, WLAN infrastructure, and so on), and AP information (SSID). How a WFD R2 source measures such information is beyond the specified scope of this document. An expected user action with respect to the information may include the user's switching the connection type according to the wireless quality information displayed with respect to the WFD R2 sink (from Wi-Fi Direct to WLAN infrastructure or vice versa). Also, if the user finds out that the current wireless quality is not in a good condition from the displayed information with respect to the WFD R2 sink, the user may relocate the position of a device (WFD R2 source, WFD R2 sink, AP) to adjust the line of sight of the device. A format of the wireless quality related information with respect to the Miracast R2 user may be defined as shown in Table 6 below.

TABLE 6

```
wfd2-wireless-quality-info = "wfd2_wireless_quality_info:" SP rcpi SP
rsni SP jitter SP connection-type SP ssid CRLF
rcpi-between-source-sink    = 1*1HEXDIG; Indicates the received
frame power level at the WFD R2 Source.        Unit is dB.
rsni-between-source-sink    = 1*1HEXDIG; Indicates the received signal
to noise indicator at the WFD R2 Source. Unit is dB.
jitter                      = 1*1HEXDIG; Indicates a variation in packet
transit    delay. Unit is ms.
Connection-type      = "wifi-direct" / "wlan-infrastructure"; Indicates
current connection type between WFD R2 Source and WFD R2 Sink.
ssid                 = 16*16HEXDIG; Indicates the identity of an ESS.
                       If the connectivity type bitmap is set to 0, SSID
value is set to 0.
rcpi-between-source-ap = 1*1HEXDIG; Indicates the received frame power
level at                        the WFD R2 Source. Unit is dB.
Rsni-between-source-ap = 1*1HEXDIG; Indicates the received frame power
level at                        the WFD R2 Source. Unit is dB.
```

The background service information includes a list of background services (namely, all of the services operating at the WFD R2 source except for the applications of the WFD R2 source displayed on the WFD R2 sink). Through an expected user action with respect to the information, a device may know the list of all of the services operating in the WFD R2 source through the screen of the WFD R2 sink. Also, based on the information, the user may take various actions. A format of the source service information with respect to the Miracast R2 user may be defined as shown in Table 7 below.

TABLE 7

```
wfd2-source-service-info = "wfd2_source_service_info:" SP number-of-
services SP service-name CRLF
Number-of-services          = 4*4HEXDIG; Identifying the number of
services (or applications) that is running in WFD R2 source except WFD
R2      source's service (or application) that is displaying in WFD R2
Sink.
```

TABLE 7-continued

```
Service-name            = 255*255HEXDIG; Identifying service title that
is running in WFD R2 source except WFD R2 source's service that is
displaying in WFD R2 Sink. e.g., Internet-explorer, Microsoft word,
WebEx, etc. The number of this field is "Number of Services * Service
title field".
```

The present invention may define a new RTSP message for delivering useful information with respect to the Miracast R2 user. In other words, the new RTSP message includes a format about battery related information, format about streaming contents, format about wireless quality related information, and format about background service information. A WFD R2 source may transmit an RTSP M17 SET_PARAMETER request message to a WFD R2 sink, and the WFD R2 source may receive an RTSP M17 response message (with okay) from the WFD R2 sink in response to the message. The RTSP M17 SET_PARAMETER request message transmitted by the WFD R2 source may include WFD R2 battery information, information about WFD R2 streaming contents, information about WFD R2 wireless quality, and information about a WFD R2 source background service.

Also, the present invention proposes transmitting additional information together with the information defined by the format about streaming contents information by embedding the information into the metadata rather than the RTSP message. The information defined in the format about streaming contents information and additional information may be defined as shown in Table 8 below.

TABLE 8

```
Title: Specifying the title of the streaming contents.
Target-url: Specifying the target url of streaming content.
```

TABLE 8-continued

Type: specifying video codec.
Duration: specifying total duration of media in seconds
Current-playing-time: current playing time.
Remaining-duration: remaining playback time from the current playing time
Resolution: detailing resolution supported by the video codec.
Size: specifying total size of the media file in bytes
Protect: support for Protection. "Protected"/"unprotected"
Channel: information of a channel through which a stream is transmitted (e.g., 2.4GH, channel number 6)
RSSI-between source-and-sink: Indicates the Received signal strength indication at the WFD R2 Source
RSNI-between source-and-sink: Indicates the received signal to noise indicator at the WFD R2 Source
RCPI-between source-and-sink: Indicates the received channel power level at the WFD R2 Source. Unit is dB.
RSSI-between source-and-ap: Indicates the Received signal strength indication at the WFD R2 Source
RSNI-between source-and-ap: Indicates the received signal to noise indicator at the WFD R2 Source
RCPI-between source-and-ap: Indicates the received channel power level at the WFD R2 Source. Unit is dB.
Streaming-transmission-type: method for transmitting a media file "Wi-Fi Direct" or "DLNA".

Metadata employed in this document is such kind of data for describing or defining data, which is configured with respect to the contents according to a predetermined rule.

Metadata may be used for expressing the corresponding contents and finding the corresponding contents promptly.

For example, metadata may include creation date/time information of the corresponding contents for which the metadata is configured, information of date/time at which the contents are uploaded to a contents management server, information of a creator of the corresponding information (human or device information), upload subject information, information of the weather (temperature, humidity, and the like) when the corresponding contents are created, and device location information when the corresponding contents are created.

Furthermore, metadata may include a comment on the corresponding contents, information of a specific device (phone number, blog address, ID registered in a social network service, and so on), history of uses of the corresponding contents (information of devices which have used the corresponding contents), information from a web server acquired by using the corresponding contents or a specific object belonging to the contents.

Contents which may be configured by metadata according to the present invention may include various types of contents such as images (still images and videos), audio, document files, flash files, applications, web documents, and web pages. It should be noted that the metadata are not always limited to the examples above.

Furthermore, when the corresponding contents of the metadata are images, metadata may be configured not only for the image itself or a specific object included in the image but also for a specific still image among a plurality of still images included in the contents if the contents correspond to a video.

Also, if it is assumed that the corresponding contents of the metadata are images, the metadata may include a specific object itself included in the image, position information of the specific object included in the image, gender indices of people included in the image (distribution of males and females), activity indices (or distribution of motions) of objects included in the image, and indices of colors included in the image (or distribution of colors).

Also, if it is assumed that the corresponding content of the metadata is a video, the metadata may include motion of interest (MOI) of a specific object belonging to the video during a predetermined time period and mark information of a particular section (for example, a section spanning from 30 seconds to 1 minute since the start of play) within the video.

Also, metadata may include identification information of contents for which the metadata is configured, and the corresponding contents may include identification information of the metadata configured for the contents. This is so intended that metadata is used to find the contents for which the metadata are configured, and contents are used to find the metadata configured for the contents.

Also, metadata may be stored and managed separately from the contents for which the metadata are configured or stored and managed by being included in the contents for which the metadata are configured. It should be noted that metadata are not limited to the examples above but may be configured to have more various types of information with respect to the corresponding contents.

Figure 9:
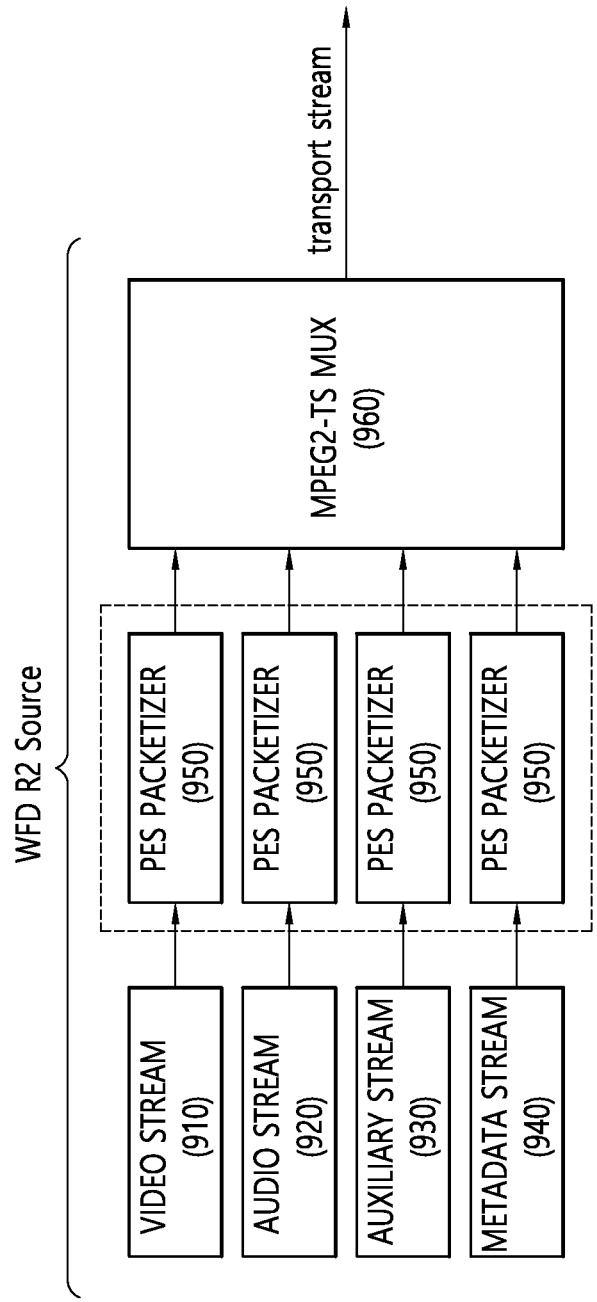
FIG. 9 illustrates a method for packetizing a plurality of streams based on the MPEG2-TS and transmitting the packetized streams according to an embodiment of the present invention.

Also, the present invention proposes to include the battery information, streaming contents information, wireless quality information, and source service information in the metadata and to deliver the metadata according to the RTSP message transmission scheme. The RTSP message transmission scheme is illustrated in FIG. 9. The metadata format is based on the ITU-T Recommendation H.222.0 specification.

As described above, the WFD source, WFD primary sink, and WFD secondary sink are the functions and services specified in the WFD, and metadata operation is not supported in the R1 but supported in the R2 specification.

At this time, wfd2-metadata-capability is used to indicate whether WFD R2 metadata operation is supported. The wfd2-metadata-capability may be formatted as shown in Table 9 below.

TABLE 9 wfd2-metadata-capability = "wfd2_metadata_capability:" SP metadata-cap CRLF;
metadata-cap = "none" / "supported"; "none" if not supported The value of "supported" represents that a WFD R2 device is capable of transmitting metadata of media contents and receiving metadata from a peer WFD R2 device. If an RTSP M3 request message includes the wfd2-metadata-capability parameter, and the WFD R2 sink does not support the features of metadata, the WFD R2 sink has to respond to the parameter by sending "none" to the RTSP M3 response message. Among the parameters included in the RTSP message, the wfd2-metadata-capability is illustrated in Table 10 below.

TABLE 10

| Parameter name | Parameter description | Method | Definition | Usage |
|---|---|---|---|---|
| wfd2-metadata-capability | Indicate the support for metadata function using RTSP. | GET | 6.1.21 | Optional in RTSP M3 request. Mandatory in RTSP M3 response if RTSP M3 request includes it. |

In what follows, a method for delivering information required for performing Miracast R2 through metadata in the WFD R2 will be described.

Direct streaming mode in the WFD R2 supports inclusion of WFD R2 metadata. WFD R2 metadata is delivered through a stream multiplexed according to the MPEG2-TS. WFD R2 metadata may include information of Tables 11 and 12 below. Table 11 illustrates information about video contents for the WFD R2, and Table 12 illustrates information about audio contents for the WFD R2. A WFD R2 device may deliver WFD R2 metadata to its peer WFD R2 device.

TABLE 11

| Name | Description |
|---|---|
| Author | Identifying the author or organization name of the content |
| Title | Identifying the title of the video content |
| Codec | Identifying the video codex of the media content |
| Duration | Identifying the total duration of the video content in seconds (e.g., hh:mm:ss) |
| Resolution | Identifying the resolution of the video content |
| Refresh rate | Identifying the refresh rate of the video content (e.g., p60) |
| Size | Identifying the total size of the video contents in bytes |
| Protection | Identifying whether media content is protected or not (e.g., "Protected" or "Unprotected") |
| URL | Identifying the target URL of the media content (e.g., http://m.mlb.com/video) |

TABLE 12

| Name | Description |
|---|---|
| Title | Identifying the title of the music content |
| Artist | Identifying the artist name |

Information shown in Table 11 and 12 may be formatted as shown in Table 13.

TABLE 13

```
metadata_record( ) {
for (i=0; i < N; i++) {
metadata_name_length (8 bits. Specifies length of metadata_name, in bytes.)
metadata_name (variable size US-ASCII string)
metadata_value_length (8 bits. Specifies length of metadata_value, in bytes.)
metadata_value (variable size UTF-8 string)
}
}
```

US-ASCII is a traditional character encoding method based on the English alphabet. UTF-8 string is a variable length character encoding method for Unicode. Therefore, metadata_name based on the alphabet may be formatted by the US-ASCII string while metadata_value based on the Unicode may be formatted by the UTF-8 string.

As another embodiment, information of Table 11 may be formatted as shown in Table 14.

TABLE 14

```
metadata_record( ) {
for (i=0; i < N; i++) {
metadata_author_length (8bits)
metadata_author (variable size UTF-8 string, length specified by metadata_author_length)
metadata_title_length (8bits)
metadata_title (variable size UTF-8 string, length specified by metadata_title_length)
metadata_codec_length (8bits)
metadata_codec (variable size UTF-8 string, length specified by metadata_codec_length)
metadata_duration_length (8bits)
metadata_duration (variable size UTF-8 string, length specified by metadata_duration_length)
metadata_resolution_length (8bits)
metadata_resolution (variable size UTF-8 string length specified by metadata_resolution_length)
metadata_refresh_rate_length (8bits)
metadata_refresh_rate (variable size UTF-8 string, length specified by metadata_refresh_rate_length)
metadata_size_length (8bits)
metadata_size (variable size UTF-8 string, length specified by metadata_size_length)
metadata_protection_length (8bits)
metadata_protection (variable size UTF-8 string, length specified by metadata_protection_length)
metadata_url_length (8bits)
metadata_url (variable size UTF-8 string, length specified by metadata_url_length)
}
}
```

As another embodiment, information of Table 12 may be formatted as shown in Table 15.

TABLE 15

```
metadata_record( ) {
for (i=0; i < N; i++) {
metadata_title_length (8bits)
metadata_title (variable size UTF-8 string, length specified by metadata_title_length)
metadata_artist_length (8bits)
metadata_artist (variable size UTF-8 string, length specified by metadata_artist_length)
metadata_album_length (8bits)
metadata_album (variable size UTF-8 string, length specified by metadata_album length)
metadata_year_length (8bits)
metadata_year (variable size UTF-8 string, length specified by metadata_year_length)
metadata_comment_length (8bits)
metadata_comment (variable size UTF-8 string, length specified by metadata_comment_length)
metadata_track_length (8bits)
metadata_track (variable size UTF-8 string, length specified by metadata_track_length)
metadata_genre_length (8bits)
metadata_genre (variable size UTF-8 string, length specified by metadata_genre_length)
}
}
```

As a yet another embodiment of the present invention, information of Tables 11 and 12 may be formatted as shown in Table 16 below.

TABLE 16

```
Metadata_record( ) {
for (i=0; i < N; i++) {
metadata_name_length (8 bits)
metadata_name (variable size US-ASCII string, length specified by
metadata_name_length)
metadata_value_length (8 bits)
metadata_value (variable size UTF-8 string, length specified by
metadata_value_length)
}
}
```

Referring to Table 16, when all of the information of Table 11 (where N represents the number of metadata information elements included in Table 11) is transmitted by being included in the metadata, the metadata is transmitted after being formatted in the US-ASCII string and the UTF-8 string format. As another embodiment, when only part (for example, title, duration, codec, and time) of the metadata information included in Table 11 is transmitted during transmission of a video stream, only the part of information (for example, title, duration, codec, time) may be included in the metadata record. However, when metadata information is newly added, the value of N may be changed, and transmission may be performed in a flexible manner.

Also, the WFD R2 metadata may include the information shown in Table 17 below. Table 17 shows a text format for the WFD R2 (for example, subtitle of video image).

TABLE 17

| Name | Description |
| --- | --- |
| Subtitle(text format) | Text format information included in the image (caption) UTF-8 string or MPEG-4 part 17 text stream or CEA 608/708 |

As an example, information of Table 17 may be formatted as shown in Table 18 below.

TABLE 18

```
metadata_record( ) {
metadata_subtitle_length (8hits)
metadata_subtitle (variable size UTF-8 string or MPEG-4 part17 text stream or CEA
608/708, length specified by metadata_subtitle_length)
}
```

Also, the WFD R2 metadata may include the information of Table 19 shown below. Table 19 shows information about graphic data (for example, image or caption) for the WFD R2.

TABLE 19

| Name | Description |
| --- | --- |
| Graphic or image | Object image included in an image (e.g, status bar of a media player, progress bar) or Subtitle of the image format (JPEG, PNG) included in the image |

As one example, information of Table 19 may be formatted as shown in Table 20 below.

TABLE 20

```
metadata_record( ) {
JPEG_descriptor_length (8bits)
JPEG_descriptor( ) {
   descriptor_tag
   descriptor_length
   image_width
   image_height
   color_space
     reserved
     for (i = 0; i < N; i++) {
        private_data_byte
     }
}
}
Or
metadata_record( ) {
PNG_descriptor_length (8bits)
PNG_descriptor( ) {
   descriptor_tag
   descriptor_length
   image_width
   image_height
   PNG_image_type
     bit_depth
     for (i = 0; i < N; i++) {
        private_data_byte
     }
}
}
```

WFD R2 metadata is delivered in a private stream but not in a stream formatted with MAUs (Metadata Access Units). At this time, the stream_id value used for streaming is private_stream_id_1, 0xbd. stream_type is set to 0x15, which indicates delivery of the WFD R2 metadata in a PES stream.

In what follows, a metadata descriptor used for the WFD R2 and PES stream format will be described.

—Descriptor Loop of PMT (Program Map Table) for Program—

To declare existence of a metadata stream, metadata_pointer_descriptor is placed in the PMT within a program_info loop for a program. The WFD R2 described in Tables 11 and 12 defines a new metadata format (metadata_application_format and metadata_format) for the delivery of WFD R2 metadata together with related information. If metadata_application_format is set to 0xFF10, and metadata_format is set to 0xC8, it indicates that the metadata format is used for delivery of the WFD R2 metadata contents. The value of metadata_application_format for "User defined" case ranges from 0x100 to 0xFFFE while the value of metadata_format for "Private use" case ranges from 0x40 to 0xFE. The present invention may define a new format for the WFD R2 from among those values (namely the value of metadata_application_format ranges from 0x100 to 0xFFFE while the value of metadata_format ranges from 0x40 to 0xFE). metadata_pointer_descriptor may include the information of Table 21 below.

TABLE 21

| Syntax | Value |
| --- | --- |
| Metadata_pointer_descriptor( ){ | |
| descriptor_tag | 37 (decimal) - Metadata_pointer_descriptor tag |
| descriptor_length | The length of the descriptor |
| metadata_application_format | 0xFF10 (for WFD R2) |
| metadata_format | 0xC8 (for WFD R2) |
| metadata_service_id | Any ID, typically 0 |
| MPEG_carriage_flags | 0 |
| reserved | 0x1f |
| if(MPEG_carriage_flags == 0\|1\|2){ | |
| program_number | program number of the program whose es descriptor loop contains the metadata_descriptor |
| } | |
| } | |

It is necessary to declare the elementary stream delivered by metadata within the loop of the elementary stream of the program map. The elementary stream parameter may include the information shown in Table 22 below.

TABLE 22

| Field | Value |
| --- | --- |
| stream_type | 0x15 |
| reserved | 0x07 |
| elementary_PID | pid of the elementary stream carrying the metadata |
| reserved | 0xf |
| ES_info_length | length of the elementary stream infor descriptor loop, including the metadata_descriptor |

—Descriptor Loop of the PMT for Elementary Stream—

To declare the format of the metadata stream, metadata_descriptor is placed in the PMT within es_info loop for elementary stream. metadata_descriptor may include the information of Table 23 shown below.

TABLE 23

| Syntax | Value |
| --- | --- |
| Metadata_descriptor( ){ | |
| descriptor_tag | 38 (decimal) - Metadata_descriptor tag |
| descriptor_length | The length of the descriptor |
| metadata_application_format | 0xFF10 (for WFD R2) |
| metadata_format | 0xC8 (for WFD R2) |
| metadata_service_id | Any ID, typically 0 |
| decoder_config_floags | 0 |
| DSM-CC_flag | 0 |
| reserved | 0xf |

—PES Stream Format—

The metadata including information of Table 11 and 12 may be stored in a PES packet as a full WFD R2 frame. A full WFD R2 frame includes a full WFD R2 header. In other words, the WFD R2 frame is used for transmitting metadata including information of Table 11 and 12. The WFD R2 header may be formatted as shown in Table 24 below.

TABLE 24 wfd2_metadata_header( ) {
  wfd2_tag (24 bits)
  wfd2_data_structure_type (1 bit)
  reserved (6 bits)

TABLE 24-continued wfd2_data_update_indicator (1 bit)
  metadata_record_size (16 bits)
}

According to Table 24, wfd2_metadata_header( ) includes wfd2_tag (24 bit), wfd2_data_structure_type (1 bit), reserved (6 bit), wfd2_data_update_indicator (1 bit), and metadata_record_size (16 bit).

wfd2_tag is a 3 byte field including a WFD-specific OUI (Organizationally Unique Identifier), and wfd2_tag may be used for identifying a WFD R2 frame delivering metadata.

wfd2_data_structure_type is a 1 bit field for identifying the metadata structure, where if wfd2_data_structure_type is 0, it indicates a video metadata structure, and if wfd2_data_structure_type is 1, it indicates an audio metadata structure.

Also, wfd2_metadata_header( ) includes reserved bits for future use, which all have to be set to zero.

wfd2_data_update_indicator is a 1 bit field indicating an update type, where, if wfd2_data_update_indicator is 0, it indicates a full update, and if wfd2_data_update_indicator is 1, it indicates an incremental update. A full update represents replacing all of previous metadata_records with new metadata_records. An incremental update represents updating previous metadata_records together with updated metadata_records. In other words, only updated metadata_records may be included in a WFD R2 frame.

metadata_record_size uses 16 bits and represents the length of the metadata_record.

Also, wfd2_metadata_header( ) may also include wfd2_header_length field representing the length of a descriptor.

Also, metadata including information of Table 17 and 19 may be stored in a PES packet as a full WFD R2 frame. A full WFD R2 frame includes a full WFD R2 header. In other words, a WFD R2 frame is intended for transmitting metadata including the information of Table 17 and 19. The WFD R2 header may be formatted as shown in Table 25 below.

TABLE 25 wfd2_metadata_header( ) {
  wfd2_tag
  wfd2_data_structure_tag
  Country code
  wfd2_subtitle_info_length
}

According to Table 25, wfd2_metadata_header( ) includes wfd2_tag, wfd2_data_structure_tag, Country code, and wfd2_subtitle_info_length.

wfd2_tag is a 3 byte field including a WFD-specific OUI (Organizationally Unique Identifier), and wfd2_tag is used for identifying a WFD R2 frame delivering metadata.

Different from Table 24, wfd2_data_structure_tag is a 2 bit field for identifying a metadata structure, where, if wfd2_data_structure_tag is 0, it indicates a video metadata structure, and if wfd2_data_structure_tag is 1, it indicates an audio metadata structure. At this time, when metadata include information of Table 17, if wfd2_data_structure_tag is 2, it indicates auxiliary content metadata structure with respect to a text format (subtitle or other format). When metadata includes information of Table 19, if wfd2_data_structure_tag is 2, it indicates auxiliary content metadata structure with respect to graphic data. If wfd2_data_structure_tag is 3, it indicates reserved bits for later use.

Country code specifies the language supported in the subtitle. When the corresponding field (Country code field) is not used, it is filled with zeros.

wfd2_subtitle_infor_length specifies the length of a WFD R2 frame body. At this time, the WFD R2 frame includes subtitle metadata information.

A WFD R2 tag has to be started immediately after the PES header. A PES header has to include PTS (Presentation Time Setup). PTS has to be synchronized with an audio and a video frame (it should be on the same timeline). data_alignment bit has to be 1. The PES header has to include PES_packet_length rather than 0. The PES header may be formatted as shown in Table 26 below.

TABLE 26

| PES Syntax | Value |
| --- | --- |
| PES_Packet( ){ | |
| packet_start_code_prefix | 0x00 0x00 0x01 |
| stream_id | 0xbd - private_stream_id_1 |
| PES_packet_length | Length of the packet, which must not be 0 |
| if(...){ | a large test which is true in this case |
| '10' | '10' |
| PES_scrambling_control | 0 |
| PES_priority | 0 |
| data_alignment_indicator | 1 for the packet containing start of the WFD2 header, else 0 |
| copyright | 0 |
| original_or_copy | 0 |
| PTS_DTS_flag | if(data_alignment ==1) '10' else '00' |
| ESCR_flag | 0 |
| ES_rate_flag | 0 |
| DSM_trick_mode_flag | 0 |
| additional_copy_info_flag | 0 |
| PES_CRC_flag | 0 |
| PES_extension_flag | 0 |
| PES_header_data_length | the length of the data; padding may be used |
| } | |
| } | |

Also, a metadata stream may be transmitted by being included in a transport stream in the same manner as an audio or a video stream. For example, only when the metadata stream is accompanied by a PES header, payload_unit_start_indicator may be set to 1 within transport_packet( ). The PES header may indicate whether WFD R2 data starts subsequently or the WFD R2 data is divided into multiple PES packets. In what follows, PES packets will be described with reference to FIGS. 9 and 10.

FIG. 9 illustrates a method for packetizing a plurality of streams based on the MPEG2-TS and transmitting the packetized streams according to an embodiment of the present invention.

FIG. 9 illustrates a transmitter which packetizes a plurality of stream according to the WFD R2 and transmitting the packetized streams. The transmitter may correspond to a WFD R2 source. The transmitter may accumulate and multiplex a video stream 910, audio stream 920, auxiliary stream 930, and metadata stream 940; and generate an MPEG2-TS 960. The MPEG2-TS 960 may correspond to a transport stream.

The video stream 910 may include video data, audio stream 920 may include audio data, auxiliary stream 930 may include auxiliary data, and metadata stream 940 may include metadata.

The video stream 910, audio stream 920, auxiliary stream 930, and metadata stream 940 may be individual ESs (Elementary Streams), and each of a plurality of ESs may have different formats, different resolutions, and different bit rates. Each of a plurality of ESs may be packetized through the PES packetizer 950 and generated as an individual PES; and each of a plurality of PESs may be accumulated and multiplexed to be generated as MPEG2-TS 960. In other words, the video stream 910 generates a PES with respect to the video stream through the video PES packetizer 950, the audio stream 920 generates a PES with respect to the audio stream through the audio PES packetizer 950, the auxiliary stream 930 generates a PES with respect to the auxiliary stream through the auxiliary PES packetizer 950, and metadata stream 940 generates a PES with respect to the metadata stream through the metadata PES packetizer.

The WFD R2 source may transmit the generated MPEG2-TS 960 to the WFD R2 sink according to the WFD R2 (or Miracast R2).

Figure 10:
FIG. 10 illustrates a structure of a PES packet according to an embodiment of the present invention.

FIG. 10 illustrates a structure of a PES packet according to an embodiment of the present invention.

Referring to FIG. 10, a PES packet includes a Packet Start Code Prefix (in what follows, PSCP), Stream ID, PES Packet Length and PES Packet Data (PES payload). PSCP and Stream ID are used to determine a scramble channel PES Packet Length is used to represent the length of a PES packet. PES Packet Data are used for storing data of image information. PSCP, Stream ID, and PES Packet Length may be called a PES header.

Hereinafter, a procedure for controlling the audio data and/or video data from the WFD R2 sink in the WFD R2 will be described. The WFD R2 primary sink may request the WFD R2 source to change the resolution and/or refresh rate of the video using a new message. Herein, the control of the video data is mainly described, but the present invention is not limited thereto and various data may be controlled.

Figure 11:
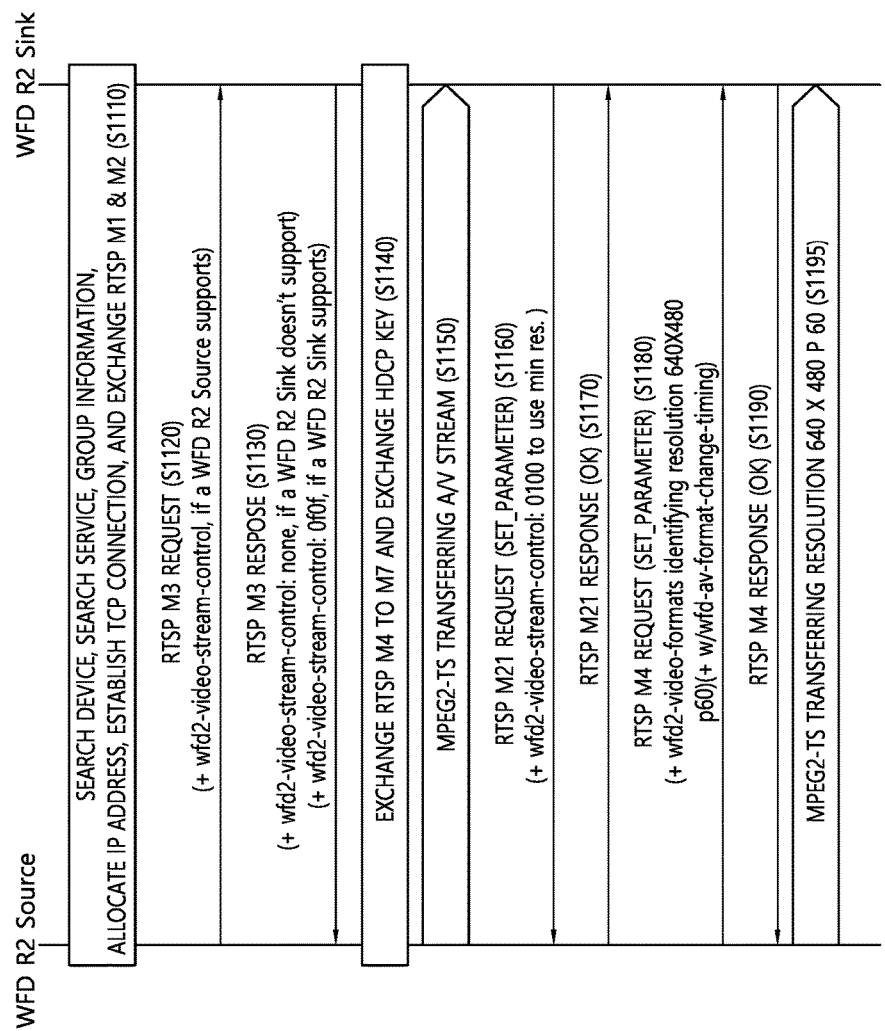
FIG. 11 is a flowchart illustrating a procedure of controlling audio data and/or video data according to an exemplary embodiment of the present invention.

FIG. 11 is a flowchart illustrating a procedure of controlling audio data and/or video data according to an exemplary embodiment of the present invention.

Referring to FIG. 11, first, as illustrated in FIGS. 4 and 6, after a WFD device discovery procedure, a WFD service discovery procedure, a WFD connection setup procedure, capability exchange and negotiation, and the like are performed, the WFD session may be established. The WFD R2 source may exchange the RTSP M1 message and the RTSP M2 message with the WFD R2 sink to begin the RSTP procedure and the WFD capability negotiation (S1110).

After the WFD session is established, the WFD R2 source may transmit an RTSP M3 request message (RTSP GET_PARAMETER request message) for acquiring a capability for at least one RTSP parameter supported by the WFD R2 sink to the WFD R2 sink (S1120). At least one RTSP parameter included in the RTSP M3 request message may be represented as shown in Table 27 below.

TABLE 27

| | |
| --- | --- |
| wfd2-video-stream-control | = "wfd2_video_stream_control:" SP v-stream-control CRLF |
| v-stream-control | = "none / (res-bitmap SP fps-bitmap), "none" if not supported |
| res-bitmap | = 2*2HEXDIG; see table below, B4:B0 set to 1 in M3 Resp, at most one hit may be set to 1 at M21 Req |
| fps -bitmap | = 2*2HEXDIG; see table below, B4:B0 set to 1 in M3 Resp, at most one bit may be set to 1 at M21 Req | wfd2-video-stream-control of Table 27 above includes v-stream-control. That is, the WFD R2 source may ask whether the WFD R2 sink supports res-bitmap and fps-bitmap through wfd2-video-stream-control.

The res-bitmap shown in Table 27 is a bitmap representation of the control method for video resolution. A detailed description of the res-bitmap may be represented as shown in Table 28 below.

TABLE 28

| Bit location | Name & meaning |
| --- | --- |
| B7:B4 | Reserved (Set to zeros at Tx, ignore at Rx) |
| B3 | Maximum resolution supported by the Source and the Sink |
| B2 | Higher resolution than currently in use |
| B1 | Lower resolution than currently in use |
| B0 | Minimum resolution supported by the Source and the Sink |

The fps-bitmap shown in Table 27 is a bitmap representation of the control method for frames per second of the video. The detailed description of the fps-bitmap may be represented as shown in Table 29 below.

TABLE 29

| Bit location | Name & meaning |
| --- | --- |
| B7:B4 | Reserved (Set to zeros at Tx, ignore at Rx) |
| B3 | Maximum fps at the resolution |
| B2 | Higher fps than currently in use |
| B1 | Lower fps than currently in use |
| B0 | Minimum fps at the resolution (if the Source supports frame skipping, B0 = 1 means 3.5 second. Otherwise, it depends on the selected resolution.) |

The WFD R2 sink may transmit an RTSP M3 response message to the WFD R2 source in response to the RTSP M3 request message (S1130). When the WFD R2 sink supports the res-bitmap and the fps-bitmap, the WFD R2 sink responds by making 0f0f be included in the wfd2-video-stream-control. When the WFD R2 sink does not support the res-bitmap and the fps-bitmap, the WFD R2 sink responds by making none be included in the wfd2-video-stream-control.

In addition, the WFD R2 source may exchange the RTSP M4 message to the RTSP M7 message and a High-bandwidth Digital Content Protection (HDCP) key to start audio/video streaming (S1140). Accordingly, the WFD R2 source may transmit the MPEG2-TS multiplexing the audio stream and/or the video stream to the WFD R2 sink (S1150). In this case, the MPEG2-TS in which the audio stream and/or the video stream are multiplexed may be referred to as a first transport stream.

During transmission of the first transport stream, the WFD sink transmit an RTSP M21 request message for setting at least one RTSP parameter value used to raise or lower the resolution and the frames per second of the video currently streamed to the WFD source (S1160). FIG. 11 illustrates an example in which the wfd2-video-stream-control included in the RTSP M21 request message is set to 0100 (for example, 0100 may indicate using a minimized resolution).

The WFD R2 source transmits an RTSP M21 response message to the WFD R2 sink in response to the RTSP M21 request message (S1170). The RTSP M21 response message includes a response to whether to agree (OK) or not (No Good, NG) with the value set by the RTSP M21 request message.

If the RTSP M21 response message agrees with the value set by the RTSP M21 request message (OK), the WFD R2 source transmit an RTSP M4 request message to set the value of at least one RTSP parameter including information on a direct video format (S1180). In FIG. 11, wfd2-video-formats and w/wfd-av-format-change-timing are included in the RTSP M4 request message and wfd2-video-formats may identify resolution 640×480 p60. If the WFD R2 sink agrees with the value set by the RTSP M4 request message, the WFD R2 sink may transmit the RTSP M4 response message indicating that the WFD R2 sink agrees with the RTSP M4 request message (OK) to the WFD R2 source (S1190). As a result, the WFD R2 source may transmit the MPEG2-TS multiplexing the stream for the resolution 640×480 p60 to the WFD R2 sink (S1195). In this case, the MPEG2-TS in which the stream for the resolution 640×480 p60 may be referred to as a second transport stream.

Figure 12:
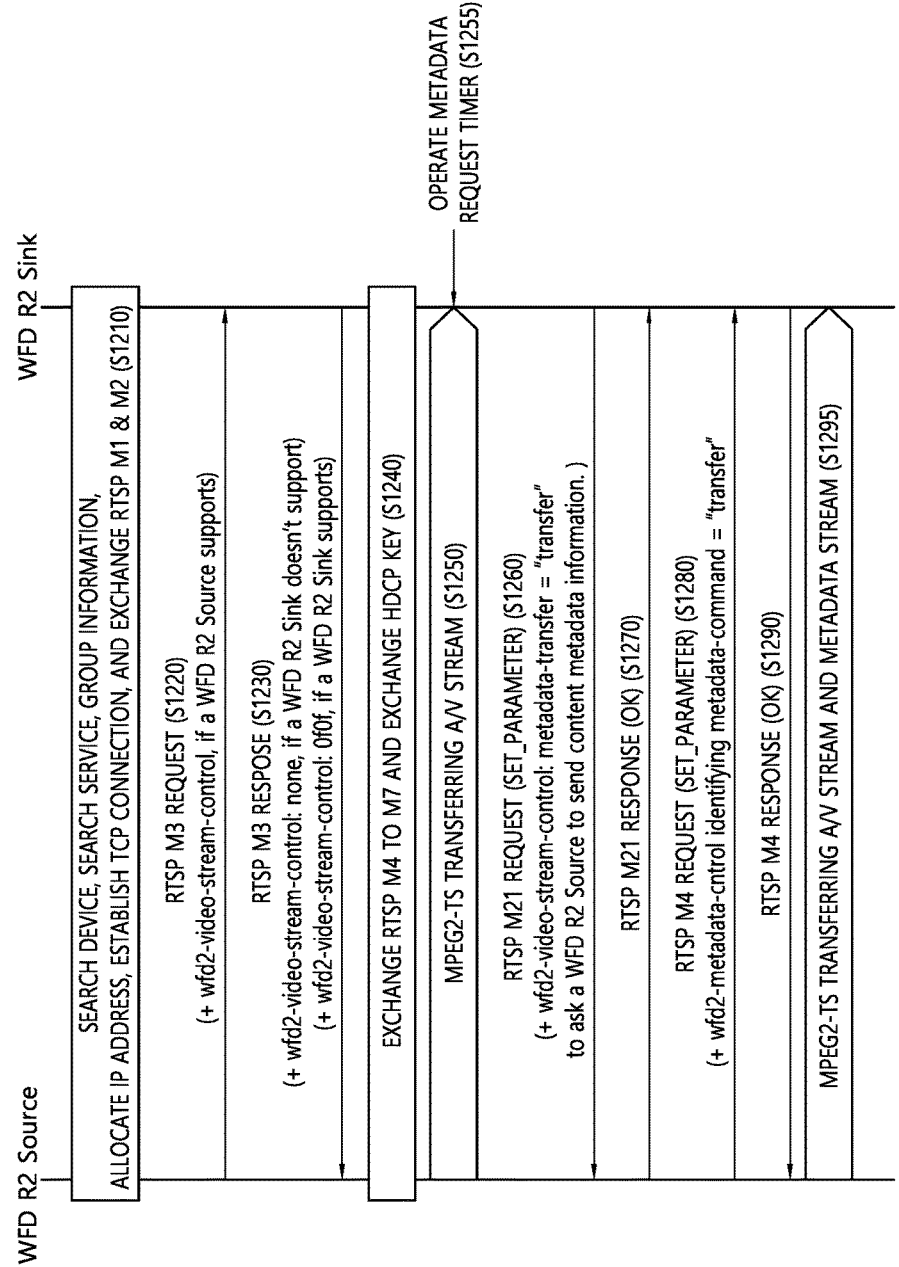
FIG. 12 is a flowchart illustrating an example of a procedure of controlling audio data and/or video data by using metadata according to an exemplary embodiment of the present invention.

FIG. 12 is a flowchart illustrating an example of a procedure of controlling audio data and/or video data by using metadata according to an exemplary embodiment of the present invention.

Referring to FIG. 12, first, as illustrated in FIGS. 4 and 6, after the WFD device discovery procedure, the WFD service discovery procedure, the WFD connection setup procedure, the capability exchange and negotiation, and the like are performed, the WFD session may be established. The WFD R2 source may exchange the RTSP M1 message and the RTSP M2 message with the WFD R2 sink to begin the RSTP procedure and the WFD capability negotiation (S1210).

After the WFD session is established, the WFD R2 source may transmit the RTSP M3 request message (RTSP GET_PARAMETER request message) for acquiring the capability for at least one RTSP parameter supported by the WFD R2 sink to the WFD R2 sink (S1220). At least one RTSP parameter included in the RTSP M3 request message may be represented as shown in Table 30 below.

TABLE 30

| wfd2-video-stream-control | = "wfd2_video_stream_control:" SP metadata_transfer CRLF |
| --- | --- |
| metadata-transfer | = ("transfer"/ "no-transfer") at M21 Reg | wfd2-video-stream-control of Table 30 above includes metadata_transfer. That is, the WFD R2 source may ask whether the WFD R2 sink may transfer metadata through the wfd2-video-stream-control.

Further, at least one RTSP parameter included in the RTSP M3 request message may include wfd2-metadata-capability of Table 9.

The WFD R2 sink may transmit the RTSP M3 response message to the WFD R2 source in response to the RTSP M3 request message (S1230). When the WFD R2 sink supports transferring the metadata, the WFD R2 sink responds by making 0f0f be included in the wfd2-video-stream-control. When the WFD R2 sink does not support transferring the metadata, the WFD R2 sink responds by making none be included in the wfd2-video-stream-control.

In addition, the WFD R2 source may exchange the RTSP M4 message to the RTSP M7 message and the High-bandwidth Digital Content Protection (HDCP) key to start the audio/video streaming (S1240). Accordingly, the WFD R2 source may transmit the MPEG2-TS multiplexing the audio stream and/or the video stream to the WFD R2 sink (S1250). In this case, the MPEG2-TS in which the audio stream and/or the video stream are multiplexed may be referred to as the first transport stream.

During transmission of the first transport stream, the WFD sink transmit an RTSP M21 request message for setting at least one RTSP parameter value in order to request transferring information on the video currently streamed to the WFD source as the metadata (S1260). FIG. 12 illustrates an example in which the wfd2-video-stream-control included in the RTSP M21 request message is set to metadata-transfer="transfer". That is, the wfd2-video-stream-control may indicate that the control of the resolution and the frames per second of the currently streamed video is transferred as the metadata.

In addition, when the WFD R2 sink receives the first transport stream, the WFD R2 sink may operate a metadata request timer after initializing the metadata request timer to zero (S1255). If the RTSP M21 request message requesting metadata transmission is not transmitted until the metadata request timer reaches a predetermined time, the WFD R2 sink may transmit the RTSP M21 request message to the WFD R2 source when the metadata request timer reaches the predetermined time.

The WFD R2 source transmits an RTSP M21 response message to the WFD R2 sink in response to the RTSP M21 request message (S1270). The RTSP M21 response message includes the response to whether to agree (OK) or not (No Good, NG) with the value set by the RTSP M21 request message.

If the RTSP M21 response message agrees with the value set by the RTSP M21 request message (OK), the WFD R2 source transmit an RTSP M4 request message to set the value of at least one RTSP parameter including the information on the metadata (S1280). In FIG. 12, wfd2-metadata-control may be included in the RTSP M4 request message and the wfd2-metadata-control may identify metadata-command="transfer". The wfd2-metadata-control may be represented as shown in Table 31 below.

TABLE 31 wfd2-metadata-control = "wfd2_metadata_control:" SP metadata-command CRLF:
metadata-command = "transfer"/ "no-transfer"

If the WFD R2 sink agrees with the value set by the RTSP M4 request message, the WFD R2 sink may transmit the RTSP M4 response message indicating that the WFD R2 sink agrees with the RTSP M4 request message (OK) to the WFD R2 source (S1290). Accordingly, the WFD R2 source may transmit the MPEG2-TS in which the audio stream and the video stream and the metadata stream including the metadata are superimposed and multiplexed to the WFD R2 sink (S1295). In this case, the MPEG2-TS in which the audio stream, the video stream, and the metadata stream are superimposed and multiplexed may be referred to as the second transport stream.

The exemplary embodiment of FIG. 12 describes a procedure in which the WFD R2 source receives a request to transfer the metadata from the WFD R2 sink while transmitting the audio and video streams to the WFD R2 sink. When information on the audio and/or video is changed, the WFD R2 sink requests that the changed information is controlled through the metadata. Therefore, the audio stream, the video stream, and the metadata stream are not superimposed and multiplexed to be transmitted as the transport stream from the beginning, but since the control by the metadata is required, only when there is a request from the WFD R2 sink, the first transport stream may be changed to the second transport stream during the existing transmission of the first transport stream. As a result, it is not necessary to continuously transmit the metadata stream, so that a burden of streaming the metadata may be reduced.

Figure 13:
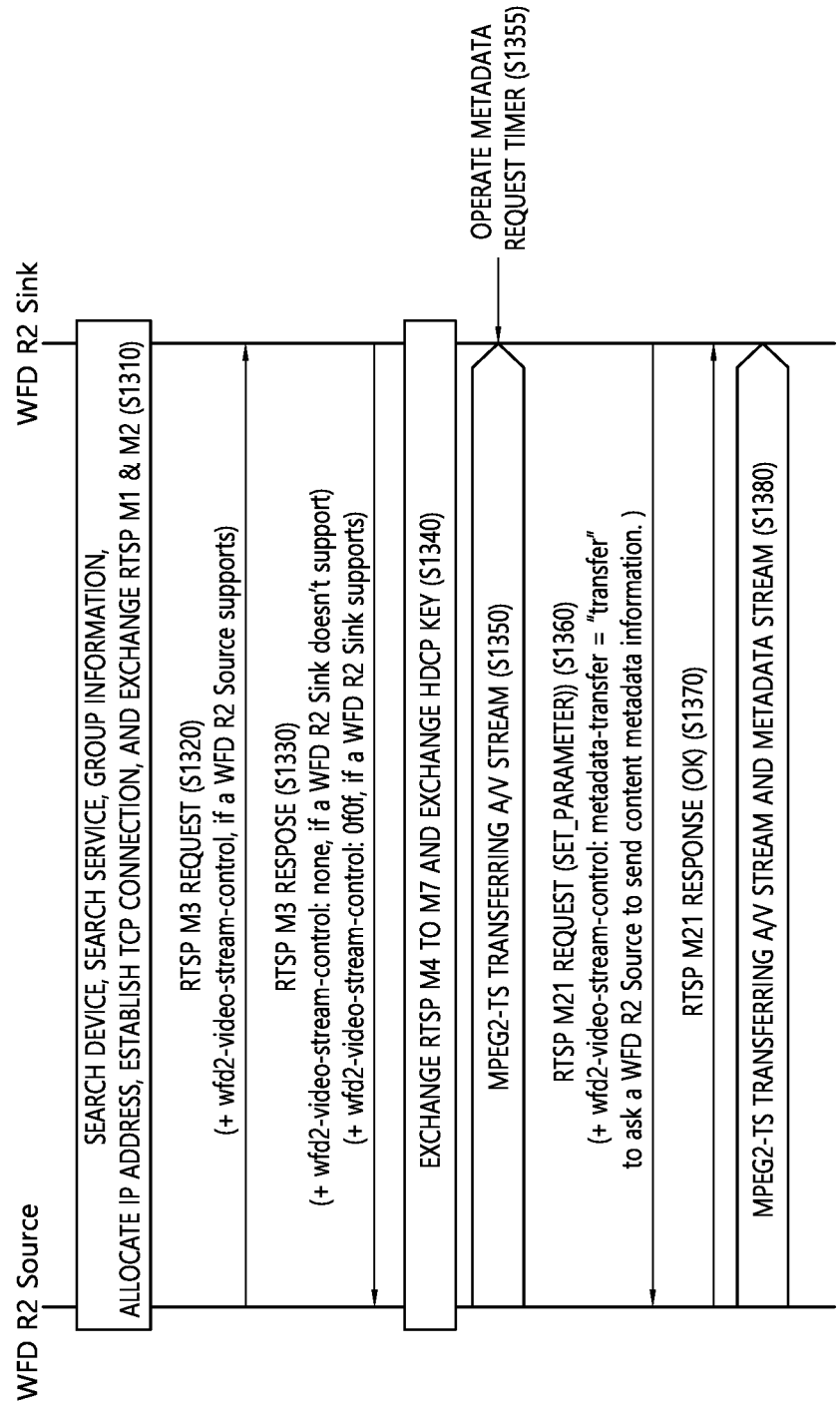
FIG. 13 is a flowchart illustrating another example of a procedure of controlling audio data and/or video data by using metadata according to an exemplary embodiment of the present invention.

FIG. 13 is a flowchart illustrating another example of a procedure of controlling audio data and/or video data by using metadata according to an exemplary embodiment of the present invention.

Referring to FIG. 13, first, as illustrated in FIGS. 4 and 6, after the WFD device discovery procedure, the WFD service discovery procedure, the WFD connection setup procedure, the capability exchange and negotiation, and the like are performed, the WFD session may be established. The WFD R2 source may exchange the RTSP M1 message and the RTSP M2 message with the WFD R2 sink to begin the RSTP procedure and the WFD capability negotiation (S1310).

After the WFD session is established, the WFD R2 source may transmit the RTSP M3 request message (RTSP GET_PARAMETER request message) for acquiring the capability for at least one RTSP parameter supported by the WFD R2 sink to the WFD R2 sink (S1320). At least one RTSP parameter included in the RTSP M3 request message may be represented as shown in Table 30 above.

The wfd2-video-stream-control of Table 30 above includes the metadata_transfer. That is, the WFD R2 source may ask whether the WFD R2 sink may transfer metadata through the wfd2-video-stream-control.

Further, at least one RTSP parameter included in the RTSP M3 request message may include the wfd2-metadata-capability of Table 9.

The WFD R2 sink may transmit the RTSP M3 response message to the WFD R2 source in response to the RTSP M3 request message (S1330). When the WFD R2 sink supports transferring the metadata, the WFD R2 sink responds by making 0f0f be included in the wfd2-video-stream-control. When the WFD R2 sink does not support transferring the metadata, the WFD R2 sink responds by making none be included in the wfd2-video-stream-control.

In addition, the WFD R2 source may exchange the RTSP M4 message or the RTSP M7 message and the High-bandwidth Digital Content Protection (HDCP) key to start the audio/video streaming (S1340). Accordingly, the WFD R2 source may transmit the MPEG2-TS multiplexing the audio stream and/or the video stream to the WFD R2 sink (S1350). In this case, the MPEG2-TS in which the audio stream and/or the video stream are multiplexed may be referred to as the first transport stream.

In addition, when the WFD R2 sink receives the first transport stream, the WFD R2 sink may operate the metadata request timer after initializing the metadata request timer to zero (S1355). When the RTSP M21 request message for requesting the transmission of the metadata until the metadata request timer reaches a predetermined time, the WFD R2 sink may transmit the RTSP M21 request message to the WFD R2 source when the metadata request timer reaches the predetermined time.

During the transmission of the first transport stream, the WFD sink transmit an RTSP M21 request message for setting at least one RTSP parameter value in order to request transferring the information on the video currently streamed to the WFD source as the metadata (S1360). FIG. 13 illustrates an example in which the wfd2-video-stream-control included in the RTSP M21 request message is set to metadata-transfer="transfer". That is, the wfd2-video-stream-control may indicate that the control of the resolution and the frames per second of the currently streamed video is transferred as the metadata.

The WFD R2 source transmits the RTSP M21 response message to the WFD R2 sink in response to the RTSP M21 request message (S1370). The RTSP M21 response message includes the response to whether to agree (OK) or not (No Good, NG) with the value set by the RTSP M21 request message.

If the RTSP M21 response message agrees with the value set by the RTSP M21 request message (OK), the WFD R2 source may thus transmit the MPEG2-TS in which the audio stream and the video stream and the metadata stream including the metadata are superimposed and multiplexed to the WFD R2 sink (S1380). In that unlike FIG. 12, in FIG. 13, the WFD R2 source directly transmits the metadata to the WFD R2 sink without the RTSP M4 request/response message after exchanging the RTSP M21 request/response message, FIG. 13 is different from FIG. 12. In this case, the MPEG2-TS in which the audio stream, the video stream, and the metadata stream are superimposed and multiplexed may be referred to as the second transport stream.

The exemplary embodiment of FIG. 13 describes a procedure in which the WFD R2 source receives a request to transfer the metadata from the WFD R2 sink while transmitting the audio and video streams to the WFD R2 sink. When the information on the audio and/or video is changed, the WFD R2 sink requests that the changed information is controlled through the metadata. Therefore, the audio stream, the video stream, and the metadata stream are not superimposed and multiplexed to be transmitted as the transport stream from the beginning, but since the control by the metadata is required, only when there is a request from the WFD R2 sink, the first transport stream may be changed to the second transport stream during the existing transmission of the first transport stream. As a result, it is not necessary to continuously transmit the metadata stream, so that a burden of streaming the metadata may be reduced.

Figure 14:
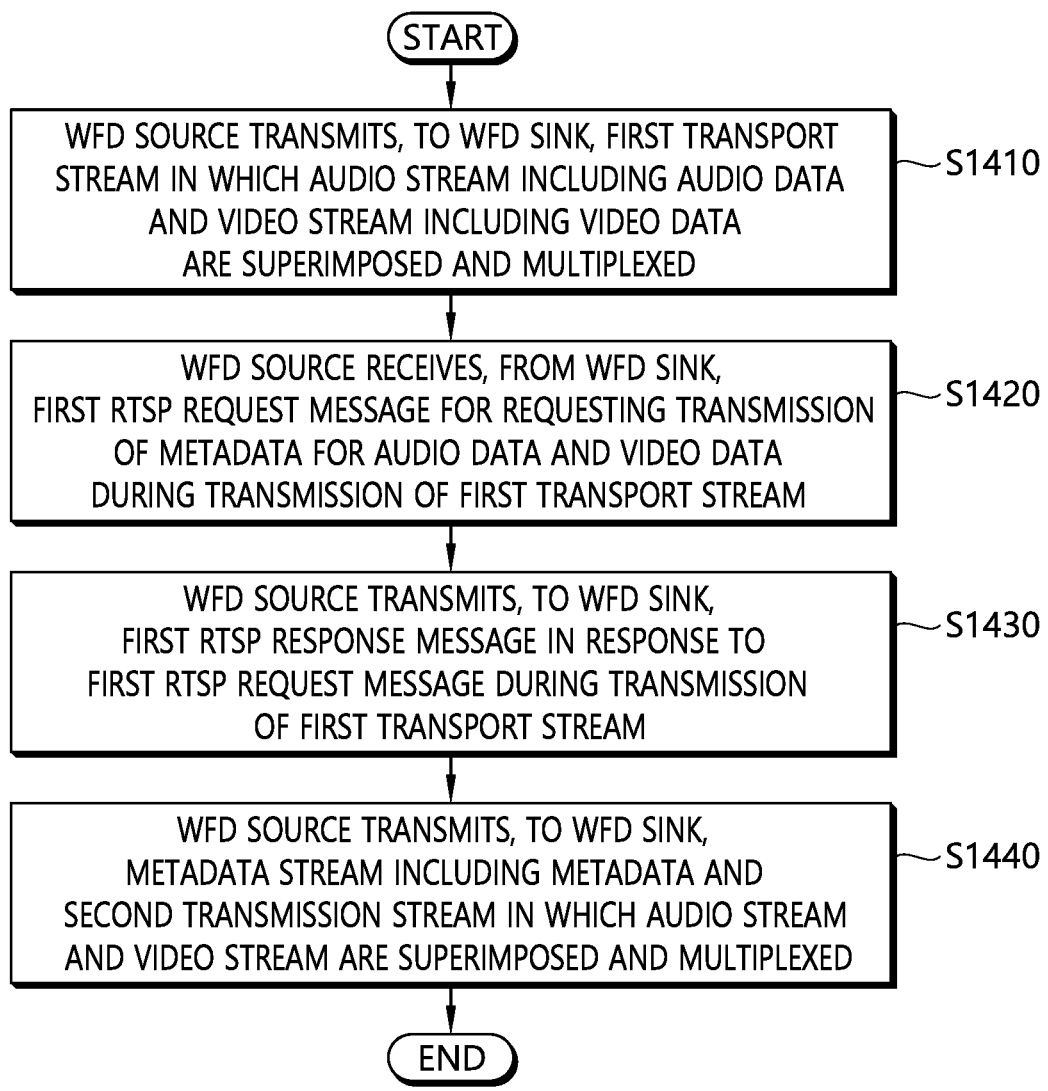
FIG. 14 is a flow diagram illustrating a procedure of transmitting metadata in the WFD R2 according to an embodiment of the present invention.

FIG. 14 is a flow diagram illustrating a procedure of transmitting metadata in the WFD R2 according to an embodiment of the present invention.

First, to clarify terms, since WFD R2 may also be expressed as WFD2, this document uses the terms of WFD R2 and WFD2 interchangeably. Also, since embodiments according to the present invention are described based on the Miracast R2, WFD is used as a concept including the WFD R2. Accordingly, a WFD source is employed as a concept including a WFD R2 source while a WFD sink is employed as a concept including a WFD R2 sink.

In step S1410, the WFD source transmits the first transport stream in which the audio stream including the audio data and the video stream including the video data are superimposed and multiplexed to the WFD sink. The first transport stream is a stream obtained by superimposing and multiplexing only the audio stream and the video stream without the metadata stream.

The first transport stream may be transmitted after the capability negotiation procedure between the WFD source and the WFD sink. The capability negotiation procedure between the WFD source and the WFD sink is described below. The WFD source transmits a WFD service search request frame for searching for a service capability to the WFD sink. In addition, the WFD source receives a WFD service search response frame in response to the WFD service search request frame from the WFD sink. The WFD source establishes a WFD connection with the WFD sink based on the WFD service search response frame. After the WFD source establishes the WFD connection, the WFD source transmits a second RTSP request message to the WFD sink for the capability negotiation procedure with the WFD sink. The WFD source transmits a second RTSP response message to the WFD sink in response to the second RTSP request message. In this case, the second RTSP request/response message may correspond to the RTSP M1 request/response message or the RTSP M2 request/response message.

In step S1420, the WFD source receives a first real time streaming protocol (RTSP) request message for requesting the transmission of the metadata for the audio data and video data during the transmission of the first transport stream from the WFD sink.

The first RTSP request message includes a control format indicating information on the resolution of the video and information on the frames per second of the video is controlled by the metadata. In this case, the information on the resolution of the video and the frames per second of the video are streamed by the first transport stream. In this case, the first RTSP request message may correspond to the RTSP M21 request message.

In step S1430, the WFD source transmits a first RTSP response message to the WFD sink in response to the first RTSP request message during the transmission of the first transport stream. In this case, the first RTSP response message may correspond to the RTSP M21 response message.

In step S1440, if the first RTSP response message agrees with the value set by the RTSP request message (OK), the WFD R2 source may thus transmit the second transport stream in which the audio stream and the video stream and the metadata stream including the metadata are superimposed and multiplexed to the WFD R2 sink.

In summary, when the information on the audio and/or video is changed, the WFD R2 sink requests that the changed information is controlled through the metadata. Therefore, the audio stream, the video stream, and the metadata stream are not superimposed and multiplexed to be transmitted as the first transport stream from the beginning, but since the control by the metadata is required, only when there is a request from the WFD R2 sink, the first transport stream may be changed to the second transport stream during the existing transmission of the first transport stream. As a result, it is not necessary to continuously transmit the metadata stream, so that a burden of streaming the metadata may be reduced.

Hereinafter, a configuration of the metadata and a process of transmitting the metadata will be described in detail.

A WFD source constitutes a WFD frame which includes a WFD header and metadata.

A WFD source transmits a packet stream, which is a stream created by packetizing a metadata stream including the WFD frame, to a WFD sink. A packet stream may correspond to a PES or PES packets.

The WFD header includes a metadata structure field and a metadata update indicator. The metadata structure field may correspond to wfd2_data_structure_type of Table 24, and the metadata update indicator may correspond to wfd2_data_update_indicator of Table 24.

The metadata structure field indicates whether metadata is configured by a video metadata structure or an audio metadata structure. In other words, metadata structure may be distinguished by the wfd2_data_structure_type value of Table 24.

The metadata update indicator indicates whether a first update or a second update is performed on the metadata. In other words, an update method may be chosen according to the value set to the wfd2_data_structure_type of Table 24. The first update may correspond to a full update in which all of the previous metadata is replaced with new metadata. The second update may correspond to an incremental update in which updated metadata is used to update previous metadata incrementally. In other words, different from the first update, if the second update is performed, only the updated metadata may be included in the WFD frame. At this time, metadata may correspond to metadata record.

Also, a metadata stream is determined by a metadata descriptor. A metadata descriptor includes a metadata application format configured by a predetermined first value and a metadata format configured by a predetermined second value. According to an embodiment of the present invention, the value of the metadata application format may be set to 0xFF10 corresponding to the predetermined first value while the value of the metadata format may be set to 0xC8 corresponding to the predetermined second value.

Also, metadata includes information about video contents and information about audio contents. Information about video contents may correspond to Table 11 while information about audio contents may correspond to Table 12. Information about video contents may include protection information indicating whether video contents are protected and URL information of the video contents. The protection information may correspond to Protection of Table 11, and the URL information may correspond to URL of Table 11.

Also, the information about video contents and the information about audio contents may be formatted by the US-ASCII string and UTF-8 string. The US-ASCII string and UTF-8 string may correspond to the scheme of Table 13.

Also, metadata may include information about a text format and/or information about graphic data. Information about the text format may correspond to Table 17, and information about graphic data may correspond to Table 19. If metadata includes information about a text format and/or information about graphic data, the WFD R2 header of the WFD R2 frame, which is a frame for transmitting the metadata, may be formatted as shown in Table 25.

Also, a metadata stream may be multiplexed with an audio stream or a video stream and transmitted as a transport stream. In the WFD R2, an auxiliary stream and/or metadata stream may be may be multiplexed together with an audio stream and/or video stream in the MPEG2-TS and transmitted as a transport stream. At this time, each stream may be packetized through a PES packetizer and generated for each of a plurality of PES. In other words, a video stream generates a PES with respect to a video stream through a video PES packetizer, an audio stream generates a PES with respect to an audio stream through an audio PES packetizer, an auxiliary stream generates a PES with respect to an auxiliary stream through an auxiliary PES packetizer, and a metadata stream generates a PES with respect to a metadata stream through a metadata PES packetizer.

Through the method described above, a WFD source may transmit metadata to a WFD sink.

Figure 15:
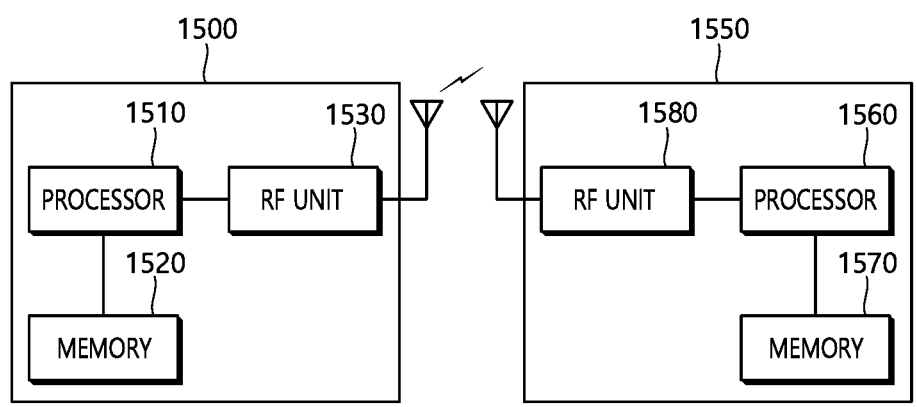
FIG. 15 is a block view illustrating a wireless device to which the exemplary embodiment of the present invention can be applied.

FIG. 15 is a block view illustrating a wireless device to which the exemplary embodiment of the present invention can be applied.

Referring to FIG. 15, the wireless device may correspond to a WFD source 1500 and a WFD sink 1550 that can embody the above-described exemplary embodiment of the present invention.

The WFD source 1500 includes a processor 1510, a memory 1520, and a radio frequency (RF) unit 1530.

The RF unit 1530 is connected to the processor 1510, thereby being capable of transmitting and/or receiving radio signals.

The processor 1510 implements the functions, processes, and/or methods proposed in the present invention. For example, the processor 1510 may be implemented to perform the operations of the WFD source 1500 according to the above-described exemplary embodiments of the present invention. The processor may perform the operations of the WFD source 1500, which are disclosed in the exemplary embodiments of FIG. 1 to FIG. 14.

The WFD sink 1550 includes a processor 1560, a memory 1570, and a radio frequency (RF) unit 1580.

The RF unit 1580 is connected to the processor 1560, thereby being capable of transmitting and/or receiving radio signals.

The processor 1560 implements the functions, processes, and/or methods proposed in the present invention. For example, the processor 1560 may be implemented to perform the operations of the WFD sink 1550 according to the above-described exemplary embodiments of the present invention. The processor may perform the operations of the WFD sink 1550, which are disclosed in the exemplary embodiments of FIG. 1 to FIG. 14.

For example, if the battery level indicated by battery status information included in the RTSP message received from a different WFD device is lower than a predetermined threshold value, the processor 1560 may be configured to transmit an RTSP message which commands the different WFD device to operate in the power save mode.

The processor 1510 and 1560 may include an application-specific integrated circuit (ASIC), another chip set, a logical circuit, a data processing device, and/or a converter converting a baseband signal and a radio signal to and from one another. The memory 1520 and 1570 may include a read-only memory (ROM), a random access memory (RAM), a flash memory, a memory card, a storage medium, and/or another storage device. The RF unit 1530 and 1580 may include one or more antennas transmitting and/or receiving radio signals.

When the exemplary embodiment is implemented as software, the above-described method may be implemented as a module (process, function, and so on) performing the above-described functions. The module may be stored in the memory 1520 and 1570 and may be executed by the processor 1510 and 1560. The memory 1520 and 1570 may be located inside or outside of the processor 1510 and 1560 and may be connected to the processor 1510 and 1560 through a diversity of well-known means.

What is claimed is:

1. A method for transmitting metadata in a WiFi display (WFD), the method comprising:

transmitting, by a WFD source to a WFD sink, a first transport stream in which an audio stream including audio data and a video stream including video data are superimposed and multiplexed;

receiving, by the WFD source from the WFD sink, a first real-time streaming protocol (RTSP) request message for requesting transmission of metadata for the audio data and the video data during the transmission of the first transport stream;

transmitting, by the WFD source to the WFD sink, a first RTSP response message, in response to the first RTSP request message, during the transmission of the first transport stream; and transmitting, by the WFD source to the WFD sink, a metadata stream including the metadata and a second transport stream in which the audio stream and the video stream are superimposed and multiplexed, wherein the first RTSP request message includes a control format indicating information on a resolution of a video and information on frames per second of the video controlled based on the metadata, and wherein the information on the resolution of the video and the information on the frames per second of the video are streamed and included in the first transport stream.

2. The method of claim 1, wherein when the WFD sink receives the first transport stream, the WFD sink operates a metadata request timer.

3. The method of claim 2, wherein when the metadata request timer reaches a predetermined time, the WFD sink transmits the first RTSP request message to the WFD source.

4. The method of claim 1, further comprising:
transmitting, by the WFD source, a WFD service search request frame for searching for a service capability, to the WFD sink;
receiving, by the WFD source, a WFD service search response frame, in response to the WFD service search request frame, from the WFD sink;
establishing, by the WFD source, a WFD connection with the WFD sink based on the WFD service search response frame;
transmitting, by the WFD source, a second RTSP request message, to the WFD sink for a capability negotiation procedure with the WFD sink after establishing the WFD connection; and
transmitting, by the WFD source, a second RTSP response message, to the WFD sink in response to the second RTSP request message,
wherein the first transport stream is transmitted after the capability negotiation procedure.

5. The method of claim 1, wherein the second transport stream is created by superimposing and multiplexing a first packet stream acquired by packetizing the audio stream, a second packet stream acquired by packetizing the video stream, and a third stream acquired by packetizing the metadata stream.

6. A WiFi display (WFD) source for transmitting metadata in a WFD, the WFD source comprising:
a receiver and transmitter; and
a processor, operatively coupled to the receiver and transmitter, wherein the processor is configured to:
control the transmitter to transmit, to a WFD sink, a first transport stream in which an audio stream including audio data and a video stream including video data are superimposed and multiplexed,
control the receiver to receive, from the WFD sink, a first real-time streaming protocol (RTSP) request message for requesting transmission of metadata for the audio data and the video data during the transmission of the first transport stream, control the transmitter to transmit, to the WFD sink, a first RTSP response message, in response to the first RTSP request message, during the transmission of the first transport stream, and control the transmitter to transmit, to the WFD sink, a metadata stream including the metadata and a second transport stream in which the audio stream and the video stream are superimposed and multiplexed, wherein the first RTSP request message includes a control format indicating information on a resolution of a video and information on frames per second of the video controlled based on the metadata, and wherein the information on the resolution of the video and the information on the frames per second of the video are streamed and included in the first transport stream.

7. The WFD source of claim 6, wherein when the WFD sink receives the first transport stream, the WFD sink operates a metadata request timer.

8. The WFD source of claim 7, wherein when the metadata request timer reaches a predetermined time, the WFD sink transmits the first RTSP request message to the WFD source.

9. The WFD source of claim 6, wherein the processor is further configured to:
control the transmitter to transmit a WFD service search request frame for searching for a service capability, to the WFD sink,
control the receiver to receive a WFD service search response frame, in response to the WFD service search request frame, from the WFD sink,
establish a WFD connection with the WFD sink based on the WFD service search response frame,
control the transmitter to transmit a second RTSP request message, to the WFD sink, for a capability negotiation procedure with the WFD sink after establishing the WFD connection, and
control the transmitter to transmit a second RTSP response message, to the WFD sink, in response to the second RTSP request message,
wherein the first transport stream is transmitted after the capability negotiation procedure.

10. The WFD source of claim 6, wherein the second transport stream is created by superimposing and multiplexing a first packet stream acquired by packetizing the audio stream, a second packet stream acquired by packetizing the video stream, and a third stream acquired by packetizing the metadata stream.

* * * * *